United States Patent [19]

Berglund et al.

[11] 4,268,902
[45] May 19, 1981

[54] MAINTENANCE INTERFACE FOR A SERVICE PROCESSOR-CENTRAL PROCESSING UNIT COMPUTER SYSTEM

[75] Inventors: Neil C. Berglund, Kasson; James R. Nieling, Rochester, both of Minn.

[73] Assignee: International Business Machines Corporation, Armonk, N.Y.

[21] Appl. No.: 953,673

[22] Filed: Oct. 23, 1978

[51] Int. Cl.³ .............................................. G06F 11/00
[52] U.S. Cl. ..................................................... 364/200
[58] Field of Search ........................................ 364/200

[56] References Cited

U.S. PATENT DOCUMENTS

| | | | |
|---|---|---|---|
| 3,585,599 | 6/1971 | Hitt et al. | 364/200 |
| 3,749,845 | 7/1973 | Fraser | 364/200 |
| 3,879,710 | 4/1975 | Maxemchuk et al. | 364/200 |
| 3,898,621 | 8/1975 | Zelinski et al. | 364/200 |
| 3,988,716 | 10/1976 | Fletcher et al. | 364/200 |
| 4,003,033 | 1/1977 | O'Keefe et al. | 364/200 |
| 4,023,142 | 5/1977 | Woessner | 364/200 |
| 4,030,072 | 6/1977 | Bjurnsson | 364/200 |
| 4,041,471 | 8/1977 | Krossa et al. | 364/200 |

Primary Examiner—Errol A. Krass

[57] ABSTRACT

A maintenance interface is provided for interfacing a service processor and a central processing unit operating asynchronously to each other. The maintenance interface includes circuitry for synchronizing the service processor to the central processing unit and decode circuitry for interpreting commands from the service processor. The maintenance interface also includes circuitry responsive to control signals from the central processing unit such that the maintenance interface establishes communication between the service processor and the central processing unit. The central processing unit includes a microprocessor for interpreting data sent between the service processor and the central processing unit. The maintenance interface is responsive to control signals from the central processing unit to resolve communication contention between the central processing unit and the service processor. The maintenance interface further facilitates the use of the LSSD testing procedure by degating central processing unit interfaces as required for this testing approach.

32 Claims, 15 Drawing Figures

※4,268,902

MAINTENANCE INTERFACE FOR A SERVICE PROCESSOR-CENTRAL PROCESSING UNIT COMPUTER SYSTEM

DESCRIPTION

1. Technical Field

This invention relates to computer systems and more particularly to a computer system having a service processor and a central processing unit, and still more particularly to a computer system including an interface for synchronizing the operation of a service processor and a central processing unit.

2. Background Art

In the design of digital processing or computing systems a frequent problem involves the controlling of a processor from an external environment. This control involves the ability to start, stop and display the facilities of a central processing unit (CPU) and is required by the user, development engineers and programmers, system programmers and maintenance personnel for the development, use and maintenance of the computing system.

Two approaches to the implementation of CPU control have been previously utilzed. A first approach includes a hardware control panel consisting of lights and switches which are physically interconnected to the hardware of the CPU. Additional hardware exists to gate registers to the display lights and to gate data from the console switches into various registers of the CPU. Further hardward exists to exercise control of the cycle of the central processing unit to control the start and stop operation from the control panel. A second approach typically exists in larger systems and involves the use of a separate microprocessor to manage several system functions. One of these functions is the control of the CPU including alter and display of CPU facilities. In this second approach, the separate microprocessor or service processor (SP) will include a bus or buses which interconnect to the central processing unit to retrieve and send data from the display console via the service microprocessor. Additionally, control lines will exist to control the start and stop operation.

Where an interface between the user and the central processing unit is managed by a service processor an additional interface is necessary because the service processor typically operates asynchronously to and much slower than the central processing unit. Even though operating asynchronously, the service processor must be able to exert precise control over the operation of the central processing unit. A further function of interfacing between a service processor and a central processing unit is to facilitate testing and maintenance of the central processing unit. Where the CPU is implemented in LSI technology, most of the facilities of the CPU are inaccessible, being buried in the middle of an LSI chip. The density of the chip makes it difficult to test and for this reason the level sensitive scan design (LSSD) testing system has been previously utilized. Therefore, the interface between the service processor and central processing unit must also be compatible with LSSD design. Basically, LSSD employs storage elements on a chip which are connected into a single shift register for test purposes. An LSSD testing procedure is described and claimed in U.S. Pat. No. 4,023,142 issued to R. J. Woessner on May 10, 1977 and entitled "Common Diagnostic Bus for Computer Systems to Enable Testing Concurrently with Normal System Operation".

A need has thus arisen for a maintenance interface for use in a computer system utilizing a service processor and central processing unit where the service processor and central processing unit operate asynchronously to each other. Such an interface must provide for communication between the central processing unit and service processor having different operating speeds. Additionally, such an interface must facilitate the LSSD testing procedure by degating central processing unit interfaces as required to use the LSSD testing procedure. Furthermore, a need has arisen for a maintenance interface which provides functions such as alter/display, start, stop, single cycle and internal microprogramming interface with minimal interface logic.

In accordance with the present invention, a maintenance interface for a service processor-central processing unit computer system is provided to interface a service processor operating slower and asynchronously to the CPU and which enables the use of an LSSD testing procedure.

In accordance with the present invention, in a computer system having a service processor where the service processor includes circuitry for generating commands, and a central processing unit operating asynchronously to the service processor where the central processing unit includes circuitry for generating control signals, a computer interface is provided. The interface includes service control logic having circuitry for synchronizing the operation of the service processor with the operation of the central processing unit. The service control logic further includes circuitry for decoding commands generated by the service processor to generate control sigals for controlling the central processing unit. Circuitry is provided responsive to the control signals generated by the central processing unit to place the service processor in a mode for receiving information from the central processing unit to thereby eliminate communication contention between the service processor and the central processing unit.

BRIEF DESCRIPTION OF DRAWINGS

For a more detailed description of the present invention and for further objects and advantages thereof, reference is made to the following Description, taken in conjunction with the accompanying drawings, in which.

DESCRIPTION OF THE PREFERRED EMBODIMENT

Figure 1:
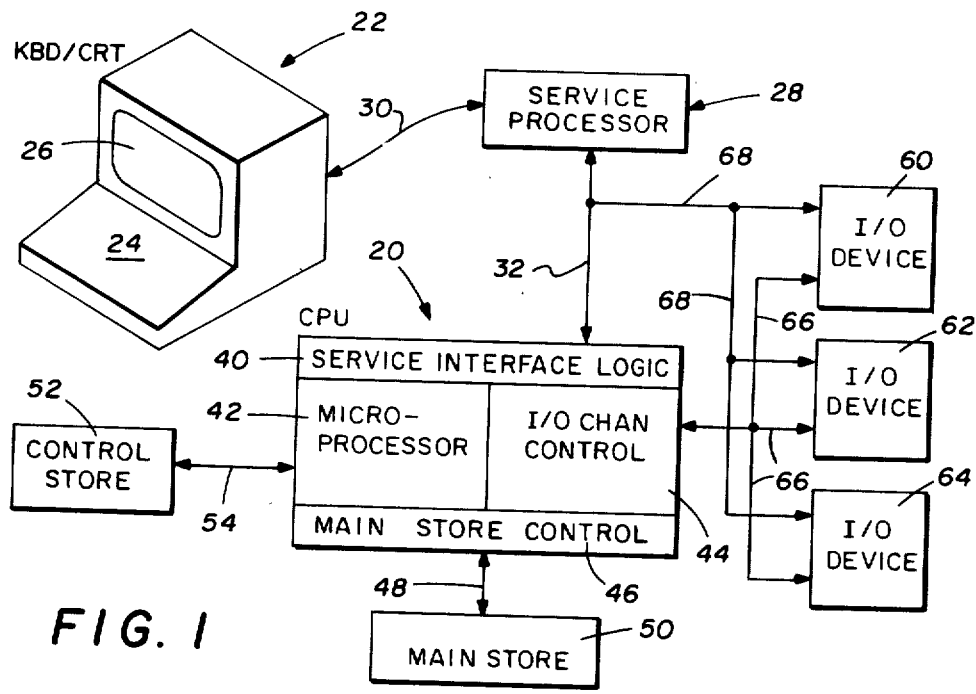
FIG. 1 is a block diagram illustrating a computer system incorporating the maintenance interference of the present invention.

To assist in the explanation of the present maintenance interface, the following is a tabulation of some of the more frequently used terms to describe components of the system. Also listed are some of the more important mnemonics used to denote the more important logic signals and commands of the system including a brief functional description.

Terms

SP—Service Processor.

CPU—The Central Processing Unit includes the service interface logic, microprocessor, channel control, and MS Control.

HMC—Horizontal Microcode is the microcode that runs on the CPU hardware.

MICROPROCESSOR (MP)—The Microprocessor is that portion of the CPU hardware that fetches and executes HMC.

MS—Main Storage contains user instructions and data as well as system related data.

CHAN—The Channel logic controls the lines on the I/O channel interface.

LSSD—Level Sensitive Scan Design requires that all latches be connected together into shift registers. This methodology allows patterns to be shifted (scanned) into and out of all latches in the design. The CPU is implemented in LSSD.

SI—Service Interface Register. This 20-bit register is the principal communication facility of the service interface logic. It is in an LSSD shift register ring by itself and is used to pass commands and data between the service processor and the CPU.

SIB—Service Interface Buffer. This 16-bit register is used in conjunction with the SI Register to pass information from the microprocessor to the service processor.

SRL—Shift Register Latch is a single storage element in an LSSD implementation.

MSC—Main Storage Control is the portion of the CPU that handles refreshing and accessing of MS data.

ALU—ALU is the Arithmetic Logic Unit for performing basic computing functions for the CPU.

CSAR—CSAR is the Control Store Address Register for CS.

CSOR—CSOR is the Control Store Output Register for CS.

Logic Signals

SCAN DATA OUT (SDO)—This signal carries the serial data from the CPU shift registers to the service processor.

SCAN DATA IN (SDI)—This signal carries serial data from the service processor to the CPU.

DIAGNOSTIC ADDRESS (4 Signals)—These signals, when decoded, select which of the shift register rings (microprocessor, channel, main storage, or SI) is to be shifted and receive data from SCAN DATA IN or provide data to SCAN DATA OUT.

A Clock—This is the LSSD shift clock which is connected to all the L1 Latches in the entire CPU.

B Clock—This is the LSSD shift clock which is connected to all the L2 latches in the entire CPU.

SP REQUEST—This signal is raised by the service processor when it has completed shifting a command into SI. The microprocessor service interface logic will decode the command in SI when it sees this signal go active.

RESPONSE—This signal is raised by the microprocessor service control logic to acknowledge the receipt of a command from the service processor.

CPU REQUEST—This signal from the CPU service control logic indicates that SIB has been loaded with a message which must be passed to the service processor.

SI ERROR—This signal is used (with RESPONSE) to indicate an invalid or out of sequence command.

Commands

CLOCK ENABLE—These commands are used to start and stop the clocks to each functional area of the CPU. The clocks are controlled by functional area so that the latches of one functional area can be scanned while another area is allowed to operate. The clock enable latches are synchronized to the clocks to each area so as to provide a controlled shutdown. This will permit the functional area to be restarted when the scan is complete.

START/STOP MICROPROCESSOR—These commands are used to start and stop microprocessor. The microprocessor must be stopped before the registers of the microprocessor are scanned. The stop command may be issued at any time since the service control logic synchronizes the command to the microprocessor clocks.

READ SIB-RESET CPU REQUEST—This command is used by the service processor to retrieve information from the microprocessor. This command causes the contents of the SIB Register to be loaded into the SI Register. The service processor is then free to scan the contents of the SI Register back to the service processor. This command may also be used to cause the CPU REQUEST latch to reset.

SP EXCEPTION—This command is used to interrupt the normal processing of the microprocessor and cause it to respond to a message from the service processor. When the command is decoded, a bit in the Exception (EX) register in the microprocessor is set.

This register is tested periodically by the microprogram to see if any exception conditions exist to be handled.

SP TRAP—This command is also used to interrupt the normal processing of the microprocessor and cause it to respond to the service processor. In this case, however, the microprocessor is immediately interrupted rather than waiting for the microprocessor to recognize the interruption at its convenience.

System Block Diagram

Referring to FIG. 1, the present maintenance interface is shown by way of example as being incorporated into a stored program computer system which includes a central processing unit (CPU) generally identified by the numeral 20. The computer system includes a keyboard and cathode ray tube (KBD/CRT) I/O device generally identified by the numeral 22. Keyboard and cathode ray tube 22 includes a keyboard 24 and a display 26. Interconnected between KBD/CRT 22 and CPU 20 is a service processor (SP) generally identified by the numeral 28. Service processor 28 includes an I/O controller, data strorage and a small central processing unit for interfacing and controlling KBD/CRT 22 as is well known in the art. Service processor 28 is interconnected to KBD/CRT 22 via a bus 30 and to CPU 20 via a bus 32.

CPU 20 includes a service interface logic unit 40 which is the subject of the present invention. Service interface logic unit 40 provides an interface between service processor 28 and CPU 20 for synchronizing service processor 28 with CPU 20 and for interpreting commands between service processor 28 and CPU 20. Additionally, service interface logic unit 40 provides functions such as alter/display, start, stop, single cycle and IMPL and facilitates the LSSD testing procedure by degating CPU interfaces as required to use the LSSD testing approach. CPU 20 further includes a microprocessor (MP) 42, an I/O channel (CHAN) control 44 and a main store (MS) control 46.

Main store control 46 is interconnected via a bidirectional bus 48 to a conventional read/write main store 50 for storing data. Main store 50 is accessed under control of main store control 46 located in central processing unit 20.

Although main store 50 could contain instructions and data for microprocessor 42, the instructions are stored in a conventional read/write control store 52 which is interconnected via a bidirectional bus 54 to CPU 20.

I/O channel control 44 is conventional and contains registers for buffering data transferred between CPU 20 and I/O devices 60, 62 and 64. I/O devices 60, 62 and 64 may comprise conventional discs, magnetic tape units, printers or card readers. I/O devices 60, 62 and 64 are interconnected to I/O channel control 44 via a bidirectional bus 66 and are also interconnected to service processor 28 via a bidirectional bus 68.

System Logic Schematics

Figure 2:
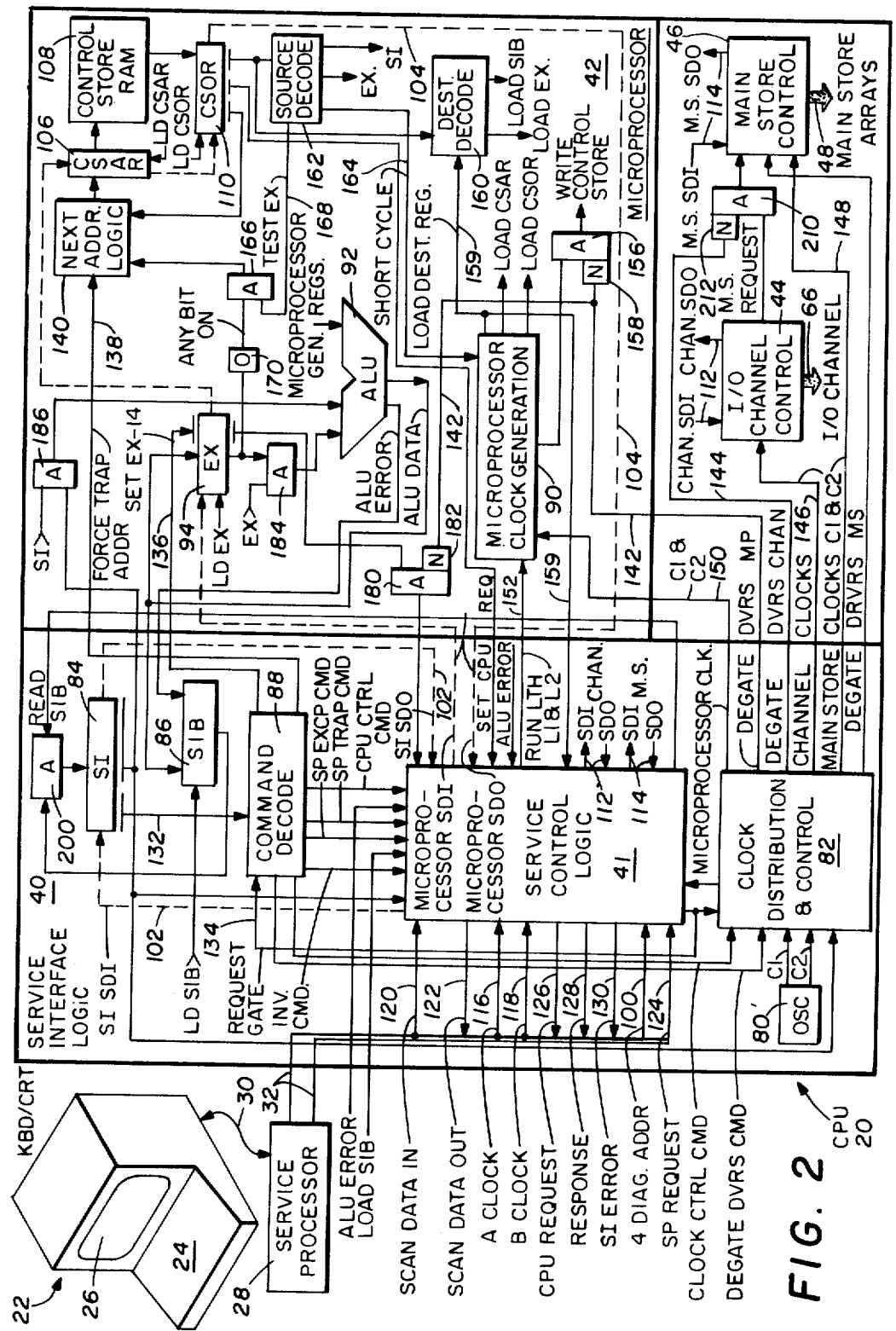
FIG. 2 is a block electrical diagram of the central processing unit block of FIG. 1 including the service control logic, microprocessor, I/O channel control and main store control.

Referring to FIG. 2, CPU 20 is illustrated in a schematic logic diagram. As previously stated, CPU 20 includes service interface logic unit 40, microprocessor 42, I/O channel control 44 and main store control 46. Service interface logic unit 40 also includes an oscillator 80 for generating the C1 and C2 Clock signals which are applied to a clock distribution and control circuit 82. Also associated with service interface logic unit 40 are SI and SIB Registers 84 and 86 the service control logic 41 and command decode circuit 88. Associated with microprocessor 42 is a micrprocessor clock generation circuit 90, an arithmetic logic unit (ALU) 92 and an Exception (EX) Register 94.

The principal components of CPU 20 previously identified will now be briefly described. Microprocessor 42 is the principal facility of CPU 20 and is used in conjunction with a microprogram to execute the high level instruction set. ALU 92 and EX Register 94 interface to service interface logic unit 40 for the exchange of data. EX Register 94 is a facility of microprocessor 42 where exception conditions are collected. The microprogram periodically checks the contents of EX Register 94 to determine if any exception conditions exist to be handled. If exceptions exist, the normal processing is interrupted while the exception condition is handled. Service control logic unit 41 has the ability to set and examine the contents of one bit position of EX Register 94 in order to interrupt normal processing of microprocessor 42 to obtain service.

The LSI chips which comprise microprocessor 42 are connected into one long shift register ring as employed in the LSSD concept. The state of any latch in microprocessor 42 can be altered or retrieved by controlling the data at the input or observing the data at the output of the shift ring while the data is being shifted.

SI Register 84 is a 20-bit register and is the principal communication facility of service interface logic unit 40. SI Register 84 is an LSSD shift register and is used to pass commands and data between service processor 28 and CPU 20. Because SI Register 84 is an independent shift register, it can be loaded by service processor 28 at any time without affecting operation of the remainder of CPU 20. Data is transmitted and received from service processor 28 serially but is processed by CPU 20 in parallel, therefore SI Register 84 serves as a serializer/deserializer. Four bits of SI Register 84 are used as a command field and the remaining sixteen bits are used for data. The SI commands and bit format will be subsequently described with reference to FIG. 14. SI Register 84 can be specified as an ALU source by the microprogram of microprocessor 42 and thereby used to pass data from service processor 28 to microprocessor 42 in CPU 20.

SIB Register 86 is a 16-bit register and is utilized in conjunction with SI Register 84 to pass information from microprocessor 42 to service processor 28. Information passed from service processor 28 to microprocessor 42 is input to SI Register 84. Information passed from microprocessor 42 to service processor 28 is input to SIB Register 86. SIB Register 86 buffers data from microprocessor 42 until service processor 28 is notified that data is available. Service processor 28 retrieves data by causing the contents of SIB Register 86 to be transferred to SI Register 84 and shifted back to service processor 28 from SI Register 84.

Command decode circuit 88 decodes the command field of SI Register 84 after SI Register 84 has been loaded with a command from service processor 28. Outputs of command decode circuit 88 are connected to perform the requested function. Since the contents of the bits of SI Register 84 change while SI Register 84 is being serially loaded, decoding cannot begin until the shift is complete. The completion of the shift of data into SI Register 84 is signified by service processor 28 when it raises the interface signal SP REQUEST applied via bus 32 to service control logic unit 41.

Clock distribution and control circuit 82 includes clock enable latches to control the clocks to the various functional units and shift rings of CPU 20. These latches, when reset, prevent the respective unit from operating. The state of the clock enable latches is controlled from service processor 28 via the SI Register 84. Also included within clock distribution and control circuit 82 are degate driver latches to control the output of interface signals from each functional area. Interface signals to other functional areas and array control signals must be deactivated when the LSSD shift operation is taking place to prevent erroneous operation of other functional areas. The degate driver latches, when set, disable the interface signals from the respective functional area. The degate driver latches are set and reset from service processor 28 via the SI Register 84. Clock distribution and control circuit 82 further includes logic for repowering and distribution of the clocks from oscillator 80 to the various functional units of CPU 20. Clock distribution and control circuit 82 receives control commands from service control logic unit 41 and also controls the run/stop sate of microprocessor 42. Clock distribution and control circuit 82 will be subsequently described with reference to FIG. 10.

Referring again to FIG. 2, service processor 28 applies via bus 32 four diagnostic addresses along signal line 100 to service control logic unit 41. These four diagnostic addresses are used by service processor 28 to select any one of the scan rings or shift rings of the present invention contained within CPU 20. Each scan ring, as will be subsequently described in more detail with reference to FIG. 5, is composed of several shift register latches (SRLs). The SRLs will be subsequently described with reference to FIGS. 3 and 4. The scan ring configuration permits the use of the LSSD testing technique in the present system. Four shift rings of the present invention will now be discussed. The first shift ring includes the SI shift ring identified by the dashed signal line 102, service interface scan data in (SI SDI). The SI shift ring 102 provides an input to the SI Register 84 whose output is applied along the scan data out portion (SI SDO) of shift ring 102 to service control logic unit 40. A second shift ring is designated as the microprocessor shift ring and is shown in FIG. 2 as the dashed signal line 104. Service control logic unit 41 provides an output to the microprocessor shift ring 104 identified as microprocessor scan data in (SDI). Shift ring 104 applies an input to the Exception Register 94 whose output is applied to a control store address register (CSAR) 106. CSAR 106 provides addresses to a control store RAM 108 which includes microinstructions for microprocessor 42. Shift ring 104 continues at the output of CSAR 106 to a control store output register (CSOR) 110. The output of CSOR 110 is applied to service control logic unit 41 as the microprocessor scan data out (SDO) portion of shift ring 104.

The third shift ring is the channel shift ring 112. Service control logic unit 41 applies the channel SDI to the I/O channel control 44 whose output is applied along the channel SDO path to service control logic unit 41. The fourth shift ring of the present invention is the main store control shift ring and is identified by the numeral 114. Service control logic unit 41 applies the scan data in signal to main store control 46 and the shift ring returns to service control logic unit 41 via the scan data out portion of the shift ring 114. In further discussion, the four shift rings will be identified as the SI shift ring 102, microprocessor shift ring 104, channel shift ring 112 and main store shift ring 114.

The four diagnostic addresses applied to service control logic unit 41 via signal line 100 are decoded by service control logic unit 41 and are utilized to enable the A Clock and B Clock applied from service processor 28 via bus 32 along signal lines 116 and 118 to service control logic unit 41. A and B Clocks are applied to shift rings 102, 104, 112 and 114 to gate data applied from service processor 28 via bus 32 along the Scan Data In signal line 120 to be applied to the first SRL of a shift ring, through the shift ring and from the last SRL in the shift ring to the Scan Data Out signal line 122 from service control logic unit 41 which is applied via bus 32 to service processor 28.

The four shift rings of the present invention permit specific functions to be performed within CPU 20. The SI shift ring 102 being a separate shift ring permits communication between service processor 28 and service interface logic unit 40 simultaneously with the performance of other operations by CPU 20. SI shift ring 102 can serially shift in a bit pattern into SI Register 84 which takes place at the speed of the service processor 28 totally asynchronously and independent of operations being performed by microprocessor 42.

Service processor 28 also applies via bus 32 the SP REQUEST signal via signal line 124 to service control logic unit 41. After a command has been scanned into the SI Register 84, service processor 28 activates SP REQUEST via signal line 124 to indicate that the command should be decoded and performed. The SP REQUEST signal is then deactivated.

The RESPONSE is applied via signal line 128 from service control logic unit 41 via bus 32 to service processor 28. RESPONSE signal is utilized in response to the SP REQUEST signal from service processor 28. After service processor 28 has placed a command in SI Register 84 and activated SP REQUEST, service interface logic unit 40 decodes the command and on a valid command activates RESPONSE to service processor 28. Service control logic unit 41 also generates the SI ERROR signal along signal line 130 to be subsequently described.

Service control logic 41 receives CPU ERROR and SET CPU REQUEST signals from microprocessor 42, either of which being active will cause the service control logic to raise CPU REQUEST as will be described in more detail in reference to FIG. 8.

Command decode 88, as will be subsequently described with reference to FIG. 9, receives SI Register 84 command field via a signal line 132 and the REQUEST GATE signal from service control logic unit 41 via signal line 134. Command decode 88 generates the INVALID COMMAND signal (INV CMD), SERVICE PROCESSOR EXCEPTION COMMAND signal (SP EXEP CMD), SERVICE PROCESSOR TRAP COMMAND signal (SP TRAP CMD), CPU CONTROL command signal (CPU CTRL CMD), all applied to clock distribution and control circuit 82. Command decode 88 also generates the SET EX-14 signal applied via signal line 136 to Exception Register 94 and the FORCE TRAP ADDRESS signal applied via signal line 138 to next address logic circuit 140.

Clock distribution and control circuit 82 receives the C1 and C2 clock signals from oscillator 80 and as will be subsequently described with reference to FIG. 11, clock distribution and control circuit 82 generates the DEGATE DRIVERS signals for the microprocessor 42, MSC 46 and CHAN. Clock distribution and control circuit 82 also generates the channel clocks applied via signal line 146 to I/O channel control 44 and the main store clocks, C1 and C2, via signal line 148 to main store control 46. Furthermore, clock distribution and control circuit 82 generates the microprocessor clocks, C1 and C2, via signal line 150 to microprocessor clock generation circuit 90.

Microprocessor clock generation circuit 90 also receives the RUN LATCH L1 and L2 signals from service control logic unit 41 via signal line 152. Microprocessor clock generation circuit 90 generates the LOAD CSAR and LOAD CSOR signals applied to CSAR 106 and CSOR 110. Microprocessor clock generation circuit 90 also generates a signal to an AND circuit 156 to generate the WRITE CONTROL STORE signal. The DEGATE DRIVERS signal applied along signal line 142 is applied to an inverter circuit 158 to block the generation of WRITE CONTROL STORE signal by AND circuit 156.

Microprocessor clock generation circuit 90 also applies a signal via signal line 159 to service control logic unit 41 and to a destination decode circuit 160 which also receives an output from CSOR 110. Destination decode circuit 160 generates the LOAD EX and LOAD SIB signals. CSOR 110 also provides an output to a source decode circuit 162 which generates the EX and SI signals. Source decode circuit 162 also provides the SHORT CYCLE signal via signal line 164 to microprocessor clock generation circuit 90. Source decode circuit 162 also provides an output to an AND circuit 166 along the TEST EX signal via signal line 168. AND circuit 166 also receives an input from Exception Register 94 via an OR circuit 170 to provide an output to next address logic 140.

Exception Register 94 provides the EX-14 bit information to an AND circuit 180 for application to service control logic unit 41. This information is blocked by the operation of an inverter circuit 182 which receives the DEGATE DRIVERS MICROPROCESSOR signal via signal line 142. Data from Exception Register 94 is applied to an AND circuit 184 which also receives the EX signal generated by source decode circuit 162 to condition ALU 92. Data is gated into ALU 92 from SI Register 84 which applies data to an AND circuit 186 which also receives the SI signal generated by source decode 162. ALU 92 also receives the MICROPROCESSOR GENERAL REGISTER INPUT signals and generates the ALU ERROR signal applied to SIB Register 86 and the ALU DATA signal applied to SIB Register 86 and Exception Register 94.

As will be subsequently described in more detail with reference to FIG. 6, service control logic unit 41 generates the READ SIB signal applied to an AND circuit 200 which also receives an output from SIB Register 86 to apply data from SI Register 84.

I/O channel control 44 generates the MS REQUEST signal which is applied to an AND circuit 210 whose output is applied to main store control 46. The MS REQUEST signal is blocked from main store control 46 by the DEGATE DRIVER CHANNEL signal of clock distribution and control circuit 82 which is applied via signal line 144 to an inverter circuit 212 whose output is applied to AND circuit 210.

An important aspect of the present invention is the function of service interface logic unit 40 to provide an interface between service processor 28 and CPU 20 which will manage communication between these two asynchronous devices. Service processor 28 is operating asynchronously and much slower than CPU 20. Consequently, service interface logic unit 40 must ensure reliable communication with no contention. In operation, when service processor 28 desires to initiate communication, it serially shifts a 20-bit word into SI Register 84. The shifting of the 20-bit word is accomplished by service processor 28 conditioning the four diagnostic addresses via signal lines 100 with the address of SI shift ring 102 and alternately pulsing the A and B clock signals applied via signal lines 116 and 118 to service control logic unit 41 twenty times each while providing the serial command data on the Scan Data In signal line 120 to service control logic unit 41. When the shift operation is complete, service processor 28 raises the SP REQUEST signal via signal line 124 to service control logic unit 41. Service processor 28 can take no further action until it receives an acknowledgment via the RESPONSE signal on signal line 128 or the SI ERROR signal via signal line 130 from service control logic unit 41. When service interface logic 40 receives the SP REQUEST signal it will decode the command in SI Register 84. The commands can be invalid, valid but unexecutable at a particular time due to other circumstances, valid and executable immediately by service interface logic unit 40, or valid but requiring interpretation by microprocessor 42. The action taken by service interface logic unit 40 in response to each of these situations is different.

If the command is invalid or undefined, the SI ERROR signal is immediately raised and remains active until service processor 28 drops the SP REQUEST signal at which time CPU 20 drops the SI ERROR signal. After service processor 28 recognizes the fall of the SI ERROR signal, it is free to load SI Register 84 with a new command and raise SP REQUEST again. The interlocking of the SP REQUEST and SI ERROR signals prevents new commands from being issued before the completion of the previous command and allows for the difference in speed of service processor 28 and microprocessor 42 and their asynchronism.

If the compound is valid but unexecutable for other reasons, CPU 20 raises RESPONSE and SI ERROR. This will indicate to the service processor 28 that a special sequence to be subsequently described with reference to FIGS. 7a and 7b must be followed before the command just issued can be issued again.

If the command is valid and executable, the RESPONSE signal is immediately raised and the command is executed. When service processor 28 recognizes the RESPONSE signal, service processor 28 drops the SP REQUEST signal and when CPU 20 recognizes SP REQUEST drop, it will drop the RESPONSE signal. When service processor 28 sees that RESPONSE has dropped it may begin the sequence for another command.

If the command is valid but requires interpretation by microprocessor 42, the RESPONSE signal is not immediately raised. The command will set EX bit 14 from command decode 88 via signal line 136 in Exception Register 94, but the RESPONSE signal will not be raised until the microprogram of microprocessor 42 recognizes the exception condition by generating the TEST EX signal applied to AND circuit 166, reads the contents of SI Register 84 and resets bit 14 in Exception Register 94. This sequence will signify to service processor 28 that the microprogram of microprocessor 42 has read the contents of SI Register 84 and service processor 28 can then drop the SP REQUEST signal. After RESPONSE has dropped the sequence can be repeated.

Service processor 28 and service interface logic 40 control and provide the communication path between the operator of KBD/CRT 22 and CPU 20. Operator commands to start, stop, alter or display are typical uses of these facilities; however, changes in status of CPU 20, which occur asynchronously to operator commands must also be passed to the operator. For example, error conditions which cause microprocessor 42 to stop must be passed to service processor 28 and displayed on KBD/CRT 22. Even though the majority of messages originate in service processor 28, the messages which CPU 20 pass to service processor 28 are of a higher priority than messages from service processor 28 to CPU 20. If an error condition has caused microprocessor 42 to stop, then it is unable to respond to certain requests from KBD/CRT 22 until the problem has been corrected or reported to the operator of KBD/CRT 22.

SIB Register 86, CPU REQUEST signal 126 and READ SIB commands are used to allow two-way communication without contention or loss of data. Because service processor 28 and microprocessor 42 are operating asynchronously, it is possible that either processor may initiate communication or that both will attempt to initiate communication simultaneously. Service processor 28 has control of SI Register 84 and because SI Register 84 is within an independent shift ring 102 from the other three previously described shift rings 104, 112 and 114 it can be loaded with a new command at any time. The microprogram of microprocessor 42 has control of SIB Register 86 and may load SIB Register 86 at any time. Generally, service processor 28 will initiate communication since it is receiving commands from KBD/CRT 22; however, if an error in microprocessor 42 has occurred, an error code will be forced into SIB Register 86 via the ALU ERROR output of ALU 92 and CPU REQUEST signal will be generated. The messages which are initiated by CPU 20 have priority over commands from service processor 28 and consequently when SIB Register 86 is loaded CPU REQUEST is generated. The only command which service control logic unit 41 will then accept is a CPU CTRL command to read the contents of SIB Register 86 and RESET CPU REQUEST. All other service processor 28 commands are rejected. This interlock prevents a new command from service processor 28 (loaded into SI Register 84 at the same time SIB Register 86 is being loaded and CPU REQUEST is being raised) from initiating an action in CPU 20 which would destroy the contents of SIB Register 86 before they can be passed to service processor 28. When service processor 28 recognizes CPU REQUEST it issues a READ SIB command to determine the state of CPU 20. If service processor 28 is loading a new command into SI Register 84 at the time SIB Register 86 is being loaded, the command in SI Register 84 will be rejected; however, no commands are lost and no contention between service processor 28 and microprocessor 42 exists. Service processor 28 reads SIB Register 86 and decides to reissue the rejected command or take alternative action based upon the contents of SIB Register 86.

An important aspect of the present invention is the ability of service processor 28 to communicate with CPU microprograms.

Service processor 28 to CPU 20 communication is initiated by service processor 28 scanning a message into the data field of SI Register 84 via the shift ring 102 and the code for SP EXCEPTION into the command field of SI Register 84. When SP REQUEST is raised by service processor 28, service interface logic unit 40 decodes the command field of SI Register 84 by operation of command decode circuit 88 and sets bit 14 in Exception Register 94 by a signal generated by command decode 88 via signal line 136. When the microprogram of microprocessor 42 recognizes the exception, it branches to a special routine. Microprocessor 42 reads the data field of SI Register 84 by selecting SI Register 84 as a source register to ALU 92. This selection is accomplished by applying SI data to AND circuit 186 and the SI signal generated by source decode circuit 162 to AND circuit 186 to gate SI data into ALU 92.

The message in SI Register 84 can be interpreted in several ways such as, for example, the message can be treated as a command to display the contents of certain memory locations of main store 50. The address of the location to be displayed would be transferred on a subsequent exchange. Once the microprogram has read the contents of SI Register 84, it will reset bit 14 of Exception Register 94. This resetting will cause RESPONSE to activate which will cause service processor 28 to drop SP REQUEST, which will in turn cause CPU 20 to drop RESPONSE. Service processor 28 can then load a new message into the data field of SI Register 84 and SP EXCEPTION command into the command field of SI Register 84 and raise SP REQUEST. Once again, CPU 20 will recognize an exception condition and will branch accordingly. In this case it may treat the contents of SI Register 84 as all or part of the address to be displayed. In this manner, any amount of data may be transferred from service processor 28 to microprocessor 42. Since CPU 20 is much faster than service processor 28, CPU 20 may perform normal processing while service processor 28 is loading the next data to be transferred into SI Register 84. Service processor 28 will not attempt to load a new message into SI Register 84 until CPU 20 has responded to the first message by resetting bit 14 of Exception Register 94.

Communication from microprocessor 42 to service processor 28 is also accomplished by the use of the present service interface logic 40. Microprocessor 42 may initiate communications to pass error conditions to the operator of KBD/CRT 22 or to respond to a request to pass the results of a user requested display of main store 50. In the first case, the microprogram (or the microprocessor hardware) loads its message into SIB Register 86 from the ALU DATA bus (or ALU ERROR signal) and sets the CPU REQUEST signal. Once the CPU REQUEST signal is raised, service control logic unit 41 executes no commands from service processor 28 except the CPU CTRL command to read the contents of SIB Register 86 and RESET CPU REQUEST. This process prevents the message from CPU 20 from being lost, since CPU 20 will not start the execution of another service processor command. Service control logic unit 41 because it rejects all commands except a READ SIB-RESET CPU REQUEST command, forces service processor 28 to read the message in SIB Request 86 before a new command can be executed.

In the second case, when the CPU microprogram is returning data to the service processor in response to a request, the CPU microprogram places the data to be returned into SIB register 86 before resetting EX bit 14 indicating that the SP EXCP command requesting the data has been handled. This alerts the service processor 28 that the requested data is available in SIB 86, which can then be retrieved by issuing a READ SIB command and subsequently scanning out SI 84.

In order to further appreciate the present invention, it is not only necessary to understand the operation of the present service interface logic unit 40, but it also is necessary to note the operation of each shift ring connected as shift registers in a manner as set forth in U.S. Pat. No. 3,806,891 issued to Eichelberger et al on Apr. 23, 1974 and entitled "Logic Circuit for Scan In/Scan Out". This can be best understood by referring to FIG. 3 which illustrates a typical shift register latch (SRL) which operates in both the shift register and non-shift register modes.

Figure 3:
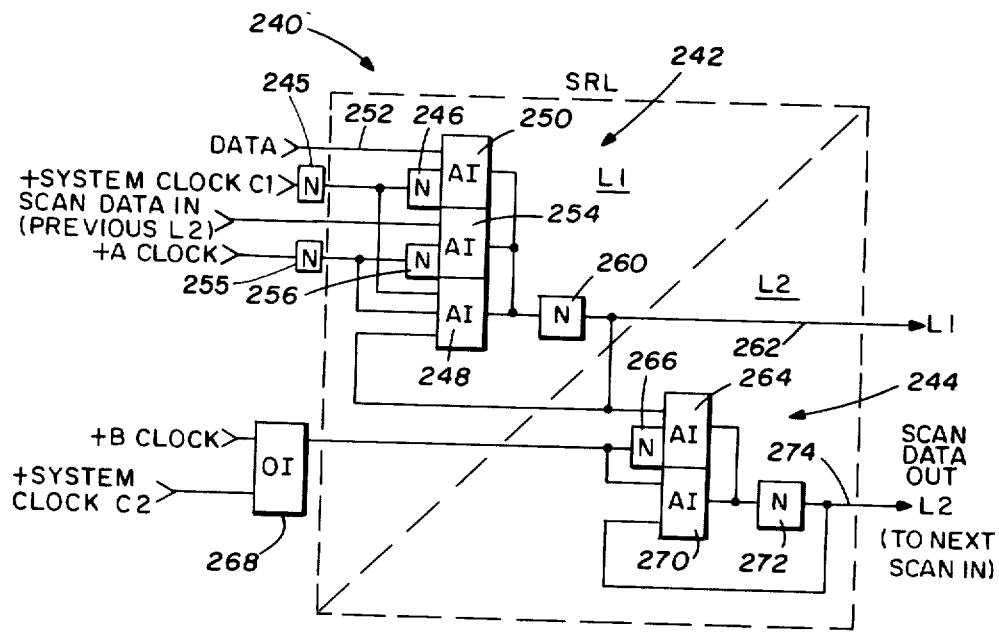
FIG. 3 is a schematic logic diagram illustrating a typical latch of the type used in a typical functional unit shift ring shown in the block diagram of FIG. 2.

Referring to FIG. 3, a typical SRL is illustrated and generally identified by the numeral 240. Each SRL 240 in a shift ring is composed of an L1 (latch 1) generally identified by the numeral 242 and an L2 (latch 2) generally identified by the numeral 244. Both L1 242 and L2 244 of SRL 240 may or may not be needed functionally, but both are necessary to perform scans along a shift ring. Either the data of L1 242 or L2 244 may be retrieved, but not both. If the data of L1s are of interest, the L2 data must be sacrificed. Similarly, if the data of L2s are of interest, the L1 data is sacrificed. On scan ins, both L1 242 and L2 244 of each SRL 240 will be initialized to the same value.

SRL 240 when operating in the nondiagnostic mode is controlled for being set and reset by system Clocks C1 and C2. Clock C1 is applied to an Inverter 245, which is applied to inverter circuit 246 and an AND Invert circuit 248 which forms part of L1 242 of latch 240. The output of Inverter circuit 246 is applied to an AND Invert circuit 250 which also receives the nondiagnostic mode data input via signal line 252.

The Scan Data In signal from a previous L2 244 is applied to an AND Invert circuit 254. The A Clock signal from service processor 28 (FIG. 2) is applied to inverter 255 which is applied to Inverter circuit 256 and AND Invert circuit 248. The outputs of AND Invert circuits 250, 254 and 248 are applied to an Inverter 260 which generates the L1 242 output via signal line 262. The output of Inverter 260 is also applied to AND Invert circuit 248.

The output of Inverter circuit 260 is applied to an AND Invert circuit 264 of latch L2 244 of shift register latch 240. AND Invert circuit 264 also receives an input from an Inverter 266 which receives an input from an OR Invert circuit 268. OR Invert circuit 268 receives the system Clock signal C2 generated by clock distribution and control circuit 82 (FIG. 2) and the B Clock signal from service processor 28 (FIG. 2). The output of OR Invert circuit 268 is also applied to an AND Invert circuit 270. The outputs of AND Invert circuits 264 and 270 are applied to an Inverter 272 which generates the L2 signal, Scan Data Out, of latch L2 244 of shift ring latch 240 via signal line 274. The output of Inverter 272 is also fed back to AND Invert circuit 270.

Shift register latch 240 essentially consists of two latches, L1 242 and L2 244 which are connected without any control lines between them. The data in L1 242 and L2 244 are identical after Clocks C1 and C2 have been applied to shift ring latch 240. However, when operating shift ring latch 240 as an element or position of a shift ring, Clocks C1 and C2 are not applied, rather the A Clock is applied to shift data into the L1 242 portion of shift register latch 240 and the B Clock is applied to transfer data from the L1 242 portion to the L2 244 portion of shift ring latch 240.

In Operation, the A Clock is used to transfer data into L1 and the B Clock is used to transfer data into the L2 of the selected shift ring, selected by one of the four diagnostic addresses from service processor 28. When the A Clock is activated, the data on Scan Data In signal line 120 is loaded into the first L1 of the selected shift ring, 102, 104, 112 or 114, and the L1s of all other shift register latches in the selected shift ring are loaded from L2s of the preceding shift register latches. When the B Clock is activated, the L2s of the shift register latches in the selected shift ring are loaded from the L1s of the same shift register latch. Therefore, to scan data into a shift ring, the desired shift ring is selected via the four diagnostic addresses from service processor 28. The data to be placed in the last shift ring latch is placed in the Scan Data In signal line 120 first, the A Clock is then activated and deactivated, and the B Clock is activated and deactivated. This procedure is then repeated for each bit of the selected shift ring, placing the data on Scan Data In signal line 120 in reverse order, such that the last data is applied first. The number of A and B Clocks is the same as is equal to the number of shift register latches in the selected shift ring.

When scanning out the data from a shift ring, the desired shift ring is selected and the A and B Clocks are pulsed one each for each shift register latch in the shift ring. At each A Clock time the data on Scan Data Out signal line 122 is sampled. The A and B Clocks must be alternating and nonoverlapping. On a scan out, the data of the L1s 242 are retrieved if the first clock is a B Clock and the data of the L2s 244 are retrieved if the first clock is an A Clock.

Figure 4:
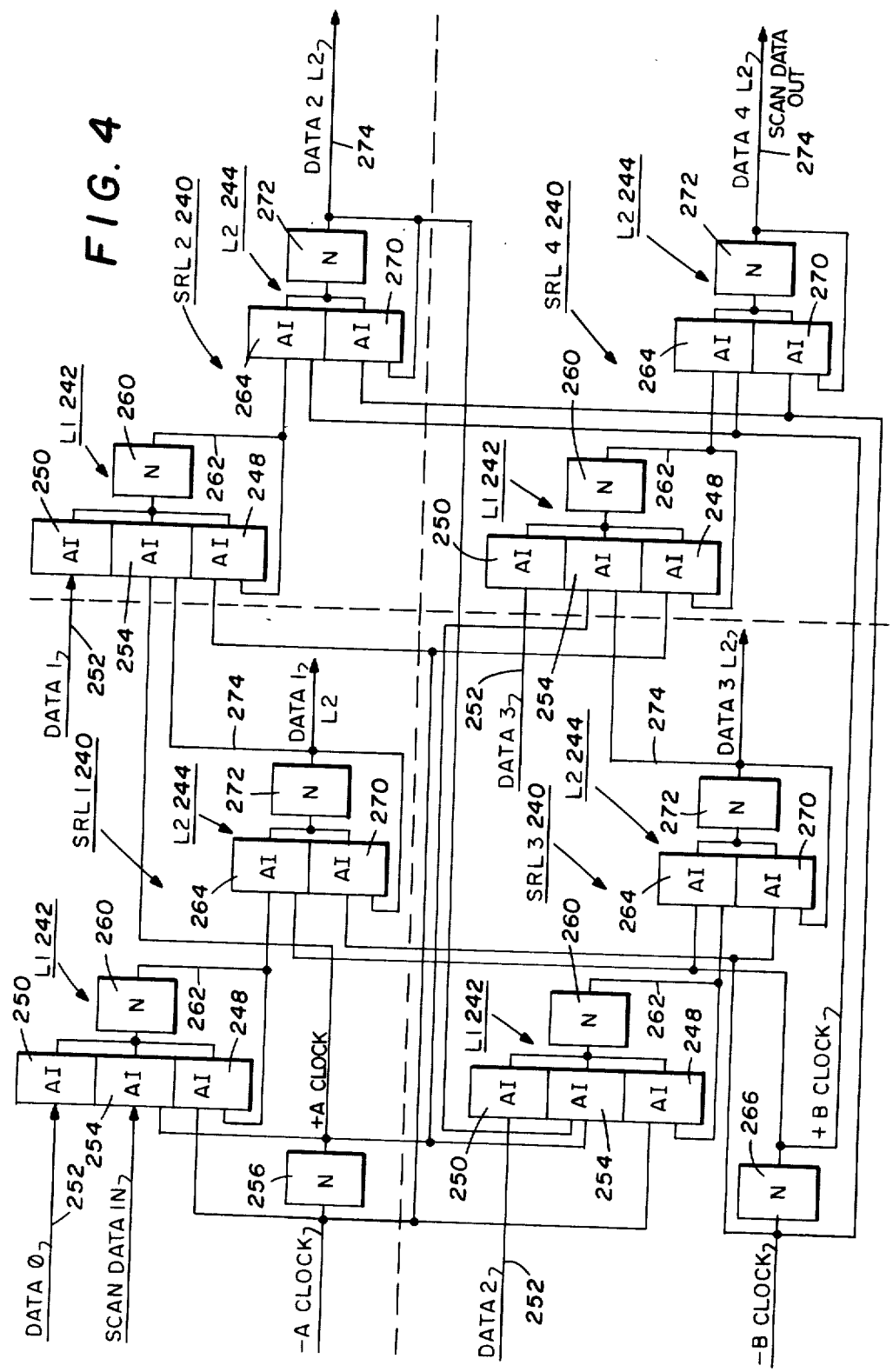
FIG. 4 is a schematic logic diagram illustrating the interconnection of four latches of a typical functional unit connected for normal operation and in a shift register ring configuration for diagnostic purposes.
Figure 5:
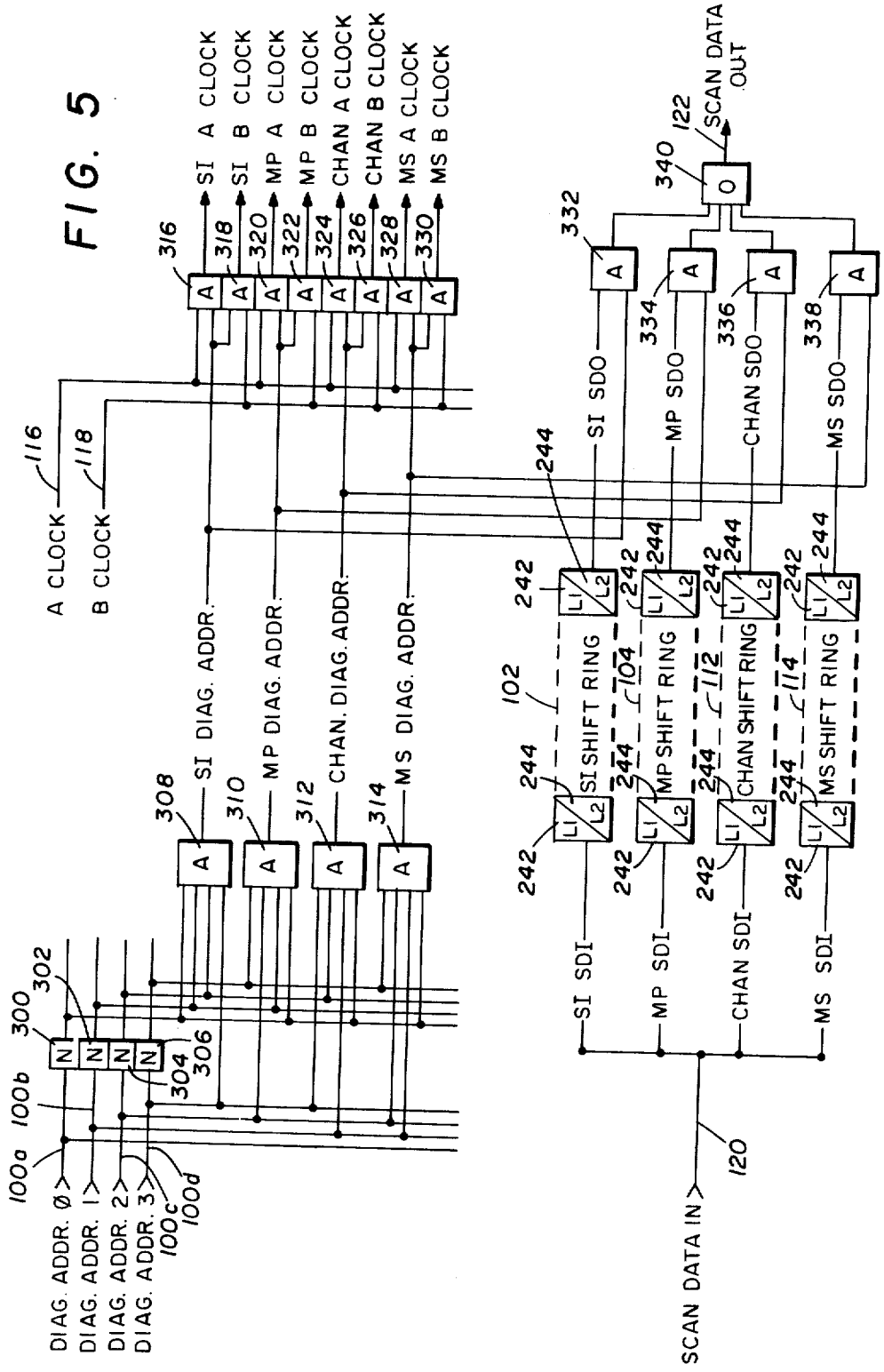
FIG. 5 is a schematic logic diagram illustrating the scan interface portion of the service control logic illustrated in the block diagram of FIG. 2.

The connection of shift register latches 240 is shown in greater detail in FIG. 4 wherein like numerals are utilized for like and corresponding components previously identified in FIG. 3. Referring to FIG. 4, four shift register latches 240 are connected to form a shift register. The output of Inverter 272 of the shift register latch 1 is connected to the Scan Data In input of AND Invert circuit 254 of shift register latch 2. Similarly, the output of Inverter 272 of shift register latch 2 is connected to the Scan Data In input of AND Invert circuit 254 of shift register latch 3 and the output of Inverter 272 for this shift register latch is applied to the Scan Data In input of AND Invert circuit 254 of shift register latch 4. The Scan Data Out signal is applied via signal line 274 and returns to service processor 28 via the Scan Data Out signal line 122 (FIG. 2).

Referring to FIG. 5, wherein like numerals are utilized for like and corresponding components previously identified, the scan interface portion of service control logic unit 41 detailing the manner in which the four diagnostic addresses applied via signal line 100 (FIG. 2) are decoded is illustrated. Shift rings 102, 104, 112 and 114 are diagrammatically illustrated in FIG. 5. The shift ring latch on the Scan Data In portion of the shift ring is the first SRL of the shift ring and the shift ring latch on the Scan Data Out portion of a shift ring is the last SRL of the shift ring. Shift rings 102, 104, 112 and 114 are of different lengths and have a common input, Scan Data In, signal line 120 and a common output, Scan Data Out, signal line 122.

The four diagnostic address lines 100 are applied via signal lines 100a, 100b, 100c and 100d to Inverter circuits 300, 302, 304 and 306 whose outputs are combined and applied to AND circuits 308, 310, 312 and 314 to generate the service interface (SI) diagnostic address, microprocessor (MP) diagnostic address, channel (CHAN) diagnostic address, and main store (MS) diagnostic address. The SI diagnostic address signal is applied to AND circuits 316 and 318. The microprocessor diagnostic address signal is applied to AND circuits 320 and 322. The channel diagnostic address signal is applied to AND circuits 324 and 326. The main store diagnostic address signal is applied to AND circuits 328 and 330. The A Clock and B Clock signals from service processor 28 are also applied to AND circuits 316–330 as illustrated in FIG. 5.

The function of AND circuits 316–330 is to specifically apply the A and B Clocks to only the particular shift ring being addressed by one of the four diagnostic address signals. Only the particular shift ring being addressed will receive the changing A and B Clocks. For example, if the service interface shift ring 102 is being addressed, the outputs of AND circuits 316 and 318 having received the inputs of A Clock and B Clock together with the SI diagnostic address will generate the SI A and SI B Clocks for the SI shift ring 102. The remaining shift rings will not receive the A and B Clocks. This is necessary because the C1 and C2 Clocks being applied to the shift ring latches cannot be applied at the same time the A and B Clocks are applied. For example, if it is desired to display the registers of microprocessor 42 without affecting main store 46 or control store 108, service processor 28 will through a clock control command stop the clocks 150 to microprocessor 42 and via a degate command will degate the drivers of microprocessor 42 by operation of clock distribution and control circuit 82 via signal line 142 (FIG. 2).

An additional reason for degating the drivers of the shift rings is that main store 50 is a dynamic type that must be periodically refreshed or it loses its contents. Therefore, when a user wishes to display the contents of a register of microprocessor 42 the clocks to microprocessor 42 must be stopped. It is not acceptable to stop the clocks to main store control 46 or main store 50 (FIG. 1) because this will cause main store 50 to lose its data. Therefore, it is necessary to have independent control of the clocks to each functional unit or shift ring and the functional unit interface signals to other functional units or arrays.

Because shift rings 102, 104, 112 and 114 have a common SCAN DATA OUT 122, the outputs of the last SRL of the shift rings are conditioned by the diagnostic address signals which are applied to AND circuits 332, 334, 336 and 338. The outputs of AND circuits 332, 334, 336 and 338 are applied to an OR circuit 340 to form a common Scan Data Out signal along signal line 122.

Figure 6:
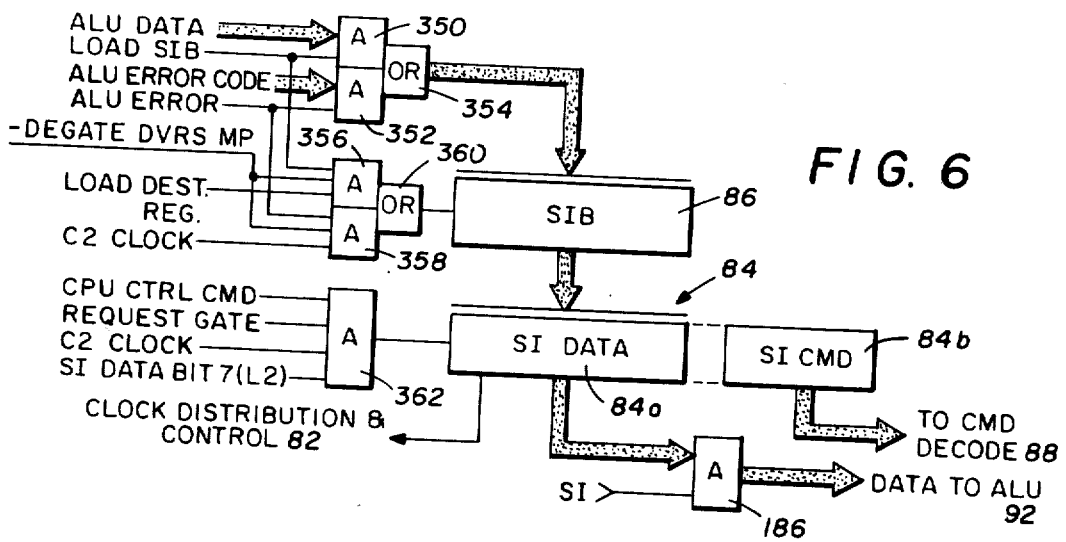
FIG. 6 is a schematic logic diagram illustrating the SI/SIB register interconnections illustrated in the block diagram of FIG. 2.

Referring simultaneously to FIGS. 2 and 6, FIG. 6 further illustrates the interconnection between SI Register 84 and SIB Register 86. ALU DATA from ALU 92 is applied to an AND circuit 350. AND circuit 350 also receives the LOAD SIB signal generated by destination decode circuit 160. The ALU ERROR CODE signal is applied to an AND circuit 352 which also receives the ALU ERROR signal. The ALU ERROR CODE signal is a hardware forced code indicating ALU error. The outputs of AND circuits 350 and 352 are applied to an OR circuit 354 whose output is applied to the data field of SIB Register 86. The LOAD SIB signal is also applied to an AND circuit 356 which also receives the LOAD DESTINATION REGISTER signal from microprocessor clock generation circuit 90. The CPU ERROR signal is applied to an AND circuit 358 which also receives the C2 Clock signal from clock distribution and control circuit 82. Both AND gates 356 and 358 receive the inverse DEGATE DRIVERS MP signal to prevent sampling the LOAD SIB and ALU ERROR signals when microprocessor 42 is being scanned. The outputs of AND circuits 356 and 358 are applied to an OR circuit 360 whose output is applied to the clock inputs of the SRLs in the SIB Register 86. The data output of SIB Register 86 is applied to the data field 84a of SI Register 84 which also receives the CPU CONTROL command signal, REQUEST GATE signal, C2 Clock signal and SI Register 84 data bit 7 through an AND circuit 362. SI Register command field 84b is applied to the command decode circuit 88. The output of SI Register data field 84a is applied to AND circuit 186 which also receives the SI signal from source decode circuit 162 to apply data to ALU 92.

Again the function of SI Register 84 and SIB Register 86 is to provide independent means for the holding of data and commands between service processor 28 and microprocessor 42 because service processor 28 and microprocessor 42 are operating as two independent processors. As such, both processors might simultaneously try to communicate with each other. Since service processor 28 can be scanning the contents of SI Register 84 and inputting a new command completely asynchronous to microprocessor 42, data cannot be input to SI Register 84 without a specific request from service processor 28 to do so. When microprocessor 42 desires to pass data back to service processor 28, it loads this data into SIB Register 86 by executing a microinstruction from control store RAM 108. This microinstruction when decoded to generate the LOAD SIB signal applied to SIB Register 86 will specify that SIB Register 86 is the destination register. Therefore, the results of an ALU 92 operation or the result of a move of data from one register to another are to go into the SIB Register 86 via the ALU DATA bus. The previously mentioned microinstruction may also generate the SET CPU REQUEST signal applied to service control logic unit 41, which in turn activated CPU REQUEST signal line 126 to service processor 28. When service processor 28 acknowledges the CPU REQUEST signal it issues the READ SIB-RESET CPU REQUEST command via service control logic unit 41 to AND circuit 200 (FIG. 2). As previously stated, once SIB Register 86 has been loaded, and the CPU REQUEST signal generated, service control logic unit 41 prevents the execution of any subsequent commands since the CPU REQUEST message is deemed to be of greater importance. SI Register 84 and SIB Register 86 therefore function as an interlock mechanism and avoid any contention problem between service processor 28 and microprocessor 42.

Figure 7A:
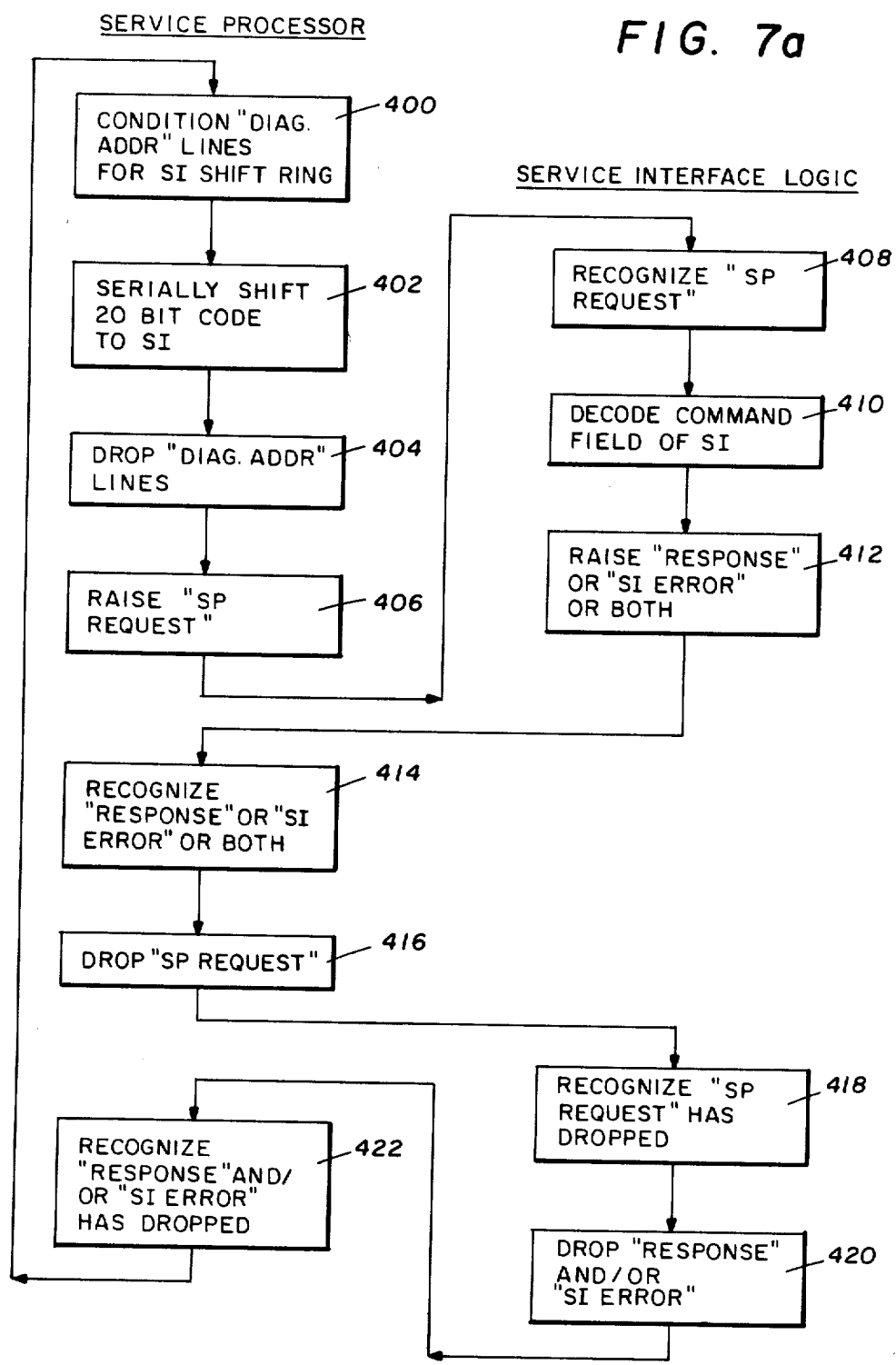
FIGS. 7a and 7b are software flow diagrams for the maintenance interface of the present invention illustrating the communication protocol between the service processor and service control logic.

FIG. 7 illustrates a flow diagram of a communication protocol between service processor 28 and service interface logic unit 40 illustrating in flow chart form the sequence of operations whenever service processor 28 passes a command to service interface logic unit 40. Specifically referring to FIG. 7a, service processor 28 at block 400 begins execution by raising the diagnostic address signal line 100 (FIG. 2). For example, the 0001 address designates the SI shift ring. At block 402, the service processor 28 serially shifts the 20-bit code into SI Register 84. SI Register 84 is 20 bits long and the code is a serial string of binary data that is scanned into SI Register 84 by applying 20 pairs of A and B Clocks from service processor 28. After this data has been completely shifted, service control logic unit 41 no longer needs the diagnostic address line and the line is dropped at block 404. Service processor 28 then raises the SP REQUEST signal at block 406.

The SP REQUEST signal is applied to service interface logic unit 40 to indicate that SI Register 84 contains data which can be decoded. Service control logic unit 40 recognizes the SP REQUEST signal from service processor 28 at block 408. Service interface logic unit 40 then decodes the command field of SI Register 84 at block 410. Based upon this command code and conditions existing in service interface logic unit 40, service control logic unit 41 will raise either the RESPONSE or SI ERROR signal or both to respond to the SP REQUEST of service processor 28. This function is performed at block 412 to be subsequently described with reference to FIG. 7b.

After service processor 28 raises the SP REQUEST signal at block 406 it waits for a response from service control logic unit 41 in the form of the RESPONSE signal, SI ERROR signal or both at block 414. Service processor 28 will recognize either the RESPONSE or the SI ERROR signal, or both which will cause service processor 28 to drop the SP REQUEST signal indicated at block 416. Service control logic unit 41 will then recognize that service processor 28 has dropped SP REQUEST at block 418. At block 420 service control logic unit 41 will drop the RESPONSE and/or SI ERROR signals which will be recognized by service processor 28 at block 422. Service processor 28 is then free to issue a new command by reinitiating the command process at block 400.

Figure 7B:
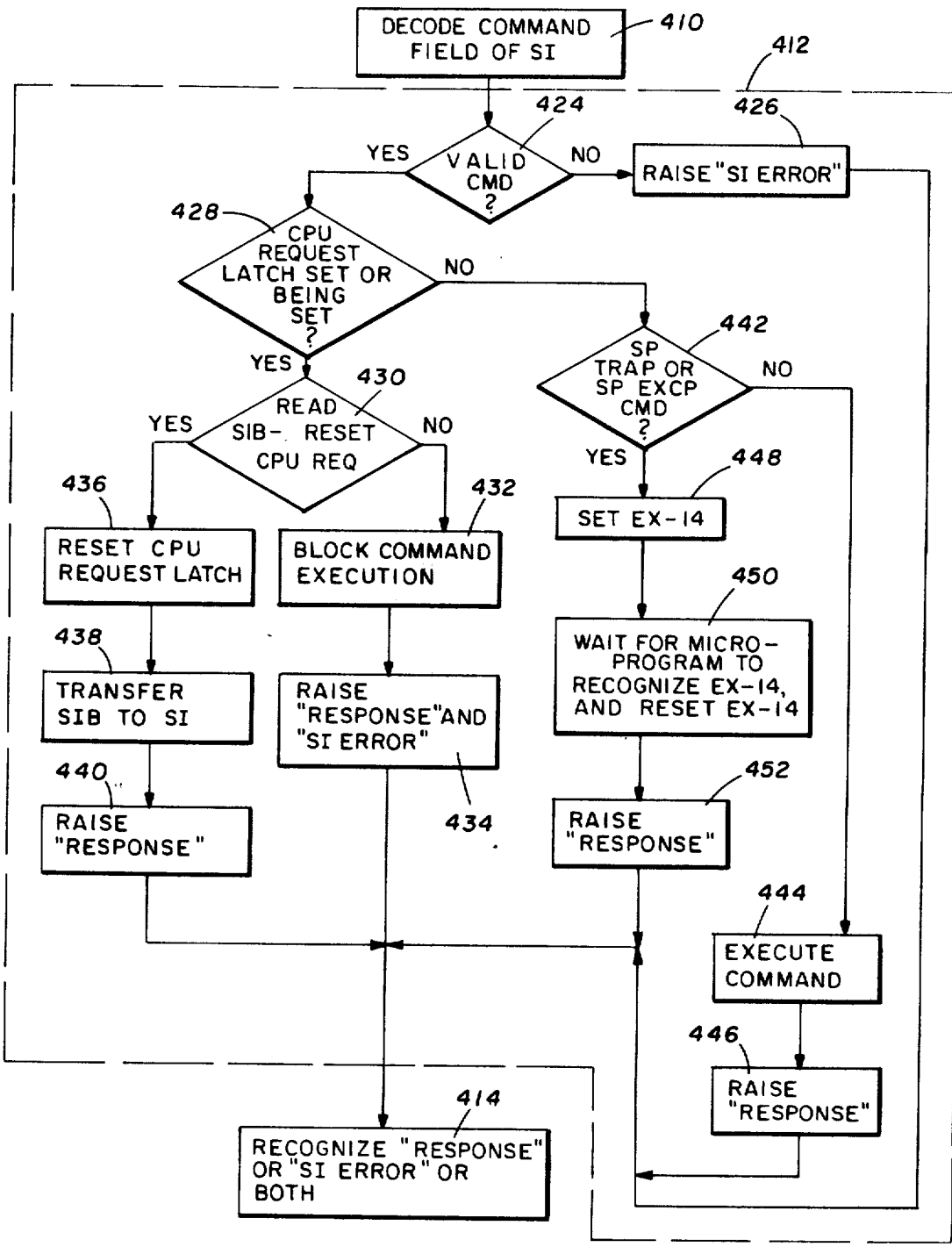

Referring to FIG. 7b, the details of the function performed by service interface logic unit 40 to raise the RESPONSE or SI ERROR signal or both at block 412 (FIG. 7a) is illustrated. The output of the decoded command field of SI Register 84 is applied to a decision block 424 to determine whether the command is valid. If the command is invalid, being undefined, the SI ERROR signal is raised at block 426 and the flow returns to block 414 such that service processor 28 recognizes this response.

If the decision at decision block 424 is that the command is valid, a decision is made at decision block 428 as to whether the CPU request latch is set or is being set. If the CPU request latch is in the process of being turned on, this is an indication that some activity in microprocessor 42 is causing the SIB Register 86 to be loaded and it is coincidental that it is being loaded at the same time service processor 28 is issuing a new command. If the CPU request latch is on, this indicates that some activity in microprocessor 42 has caused SIB Register 86 to be loaded and the CPU request latch set since the last time it was sampled by the service processor. This will be detected when the present command is rejected. If the decision in decision block 428 is yes, a decision is made at decision block 430 to determine if the command is a READ SIB-RESET CPU REQUEST command. If the command is not a READ SIB-RESET CPU REQUEST command, the execution of the command is blocked at block 422 to prevent destruction of information that microprocessor 42 has placed into SIB Register 86. If the CPU request latch is on at block 428 and the command being passed is not a READ SIB-RESET CPU REQUEST command, service control logic unit 41 will block execution of the command and at block 434 RESPONSE and SI ERROR signals will be raised and passed to block 414 to be recognized by service processor 28. This response will cause the service processor to issue a READ SIB-RESET CPU REQUEST command before it repeats the rejected command.

If the decision at READ SIB-RESET CPU REQUEST command block 430 is yes, the CPU request latch will be reset at block 436. At block 438, a transfer of data from SIB Register 86 is made to SI Register 84 and at block 440 the RESPONSE signal is raised. The flow continues to block 414 such that service processor 28 recognizes the RESPONSE signal. The service processor will issue 20 pairs of A and B Clocks to retrieve the contents of SI.

If the CPU request latch is not set or being set at decision block 428, a decision is made at decision block 442 to determine whether the SP TRAP or SP EXCEPTION command is the present command. If the SP TRAP or SP EXCEPTION command is not present, this indicates that a valid command is present which can be executed at block 444. A RESPONSE signal is raised at block 446 and is indicated to block 414. If the decision at decision block 442 was yes, that the command is a SP TRAP or SP EXCEPTION command, this indicates that the command will perform communications between service processor 28 and microprocessor 42. At block 448, the bit 14 of Exception Register 94 is set. At block 450 the flow waits until the microprogram of microprocessor 42 recognizes Exception Register 94 bit 14 and resets Exception Register 94 bit 14. When the microprogram of microprocessor 42 resets Exception Register 94 bit 14 this indicates that the command has been performed and the RESPONSE signal is raised at block 452 to indicate that the data field of SI has been read by the microprogram. At this point the flow returns to block 414 where service processor 28 recognizes the RESPONSE command.

Figure 8:
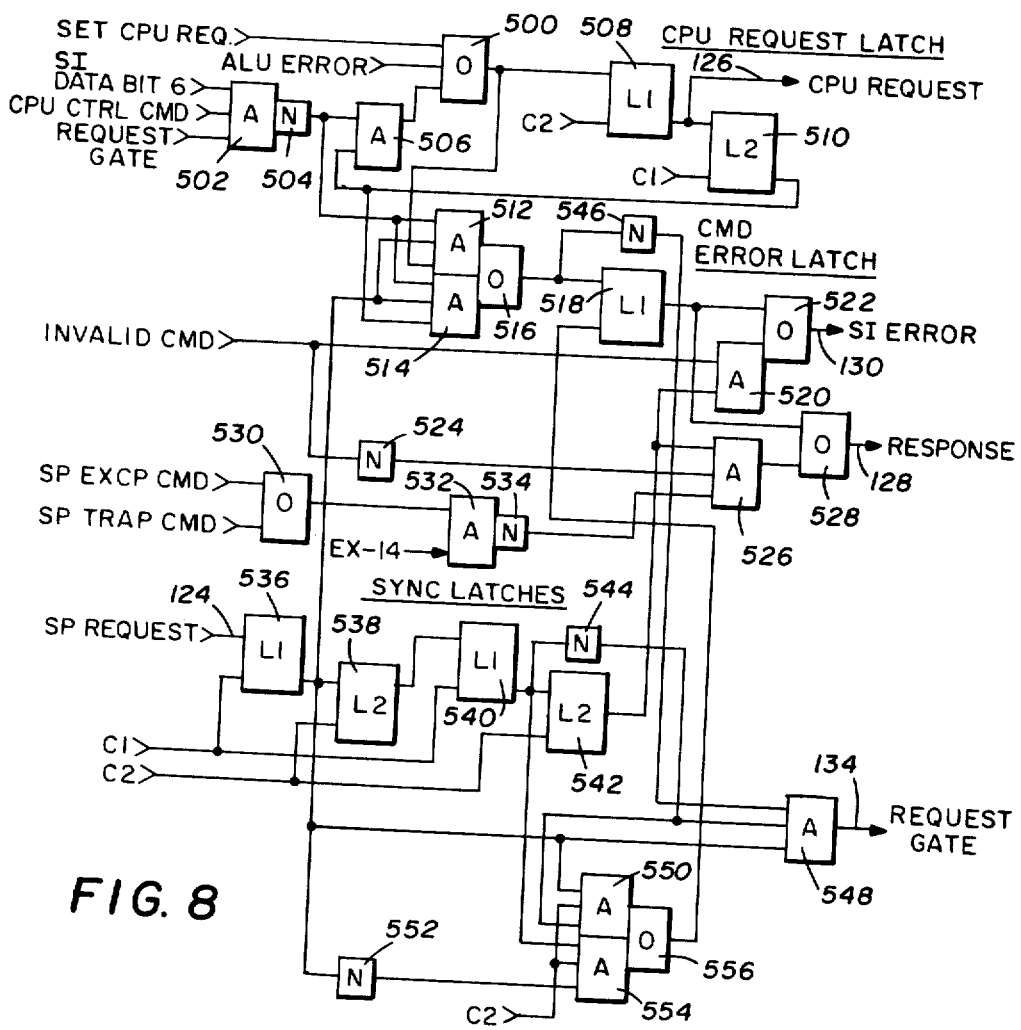
FIG. 8 is a schematic logic diagram illustrating the CPU Request and SYNC latches of the service control logic illustrated in the block diagram of FIG. 2.

FIG. 8 illustrates a portion of the logic circuitry of service control logic unit 41 (FIG. 2) which generates the CPU REQUEST, SI ERROR, RESPONSE and REQUEST GATE signals. The SET CPU REQUEST signal from microprocessor 42 microinstruction is applied to an OR circuit 500. OR circuit 500 also receives the ALU ERROR signal. The SI Register 84 data bit 6, CPU CTRL CMD generated by command decode circuit 88 (FIG. 2) and REQUEST GATE signals are applied to AND circuit 502 whose output is applied to an Inverter circuit 504. The output of Inverter circuit 504 is applied to an AND circuit 506 whose output is applied to OR circuit 500. The output of OR circuit 500 is applied to an L1 SRL 508 which also receives the C2 Clock signal. The output of SRL 508 is applied via signal line 126 to generate the CPU REQUEST signal to service processor 28. The output of SRL 508 is also applied to an L2 SRL 510 which also receives the C1 Clock signal. The output of SRL 510 is applied as an input to AND circuit 506.

The output of Inverter circuit 504 together with the output of OR circuit 500 is applied to an AND circuit 512. The output of SRL 510 and Inverter circuit 504 are applied to an AND circuit 514. The outputs of AND circuits 512 and 514 are applied to an OR circuit 516 whose output is applied to the L1 of the COMMAND ERROR LATCH 518. AND circuit 520 receives as an input signal the INVALID COMMAND signal generated by command decode circuit 88 (FIG. 2). The output of AND Circuit 520 is applied together with the output of L1 518 to an OR circuit 522 which generates the SI ERROR signal along signal line 130.

The INVALID COMMAND signal is also applied to an Inverter circuit 524 whose output is applied to an AND circuit 526. The output of AND circuit 526 is applied to an OR circuit 528 which also receives the output of SRL 518 to generate the RESPONSE signal via signal line 128.

The SP EXCP command and SP TRAP command generated by command decode circuit 88 (FIG. 2) are applied to an OR circuit 530 whose output is applied to and AND circuit 532. AND circuit 532 also receives as an input the EX-14 signal from EX Register 94. The output of AND circuit 532 is applied to an Inverter circuit 534 whose output is applied to AND circuit 526.

The SP REQUEST signal from service processor 28 is applied via signal line 124 to an L1 SRL 536 which also receives the C1 Clock signal. The output of SRL 536 is applied to an L2 SRL 538 which also receives the C2 Clock signal. The output of SRL 538 is applied to an L1 SRL 540 which also receives the C1 Clock signal as an input. The output of SRL 540 is applied to an L2 SRL 542 which also receives as an input signal the C2 Clock signal. The output of SRL 542 is applied to AND circuits 520 and 526. The output of SRL 540 is also applied to an Inverter circuit 544. The output of OR circuit 516 is applied to an Inverter circuit 546. The outputs of Inverter circuits 544 and 546 together with the output of SRL 536 are applied to an AND circuit 548 to generate the REQUEST GATE signal applied via signal line 134.

The output of SRL 536 is also applied to an AND circuit 550 and through an inverter 552 to an AND circuit 554. AND circuits 550 and 554 also receive as an input the C2 Clock signal. AND circuit 550 receives the output of Inverter circuit 544 and AND circuit 554 receives the output of SRL 540. The outputs of AND circuits 550 and 554 are applied to an OR circuit 556 whose output is applied as a clock to SRL 518. The function of SRLs 536 and 538 are to synchronize the SP REQUEST signal with the C1 and C2 Clock signals and to provide REQUEST GATE signal 134.

Figure 9:
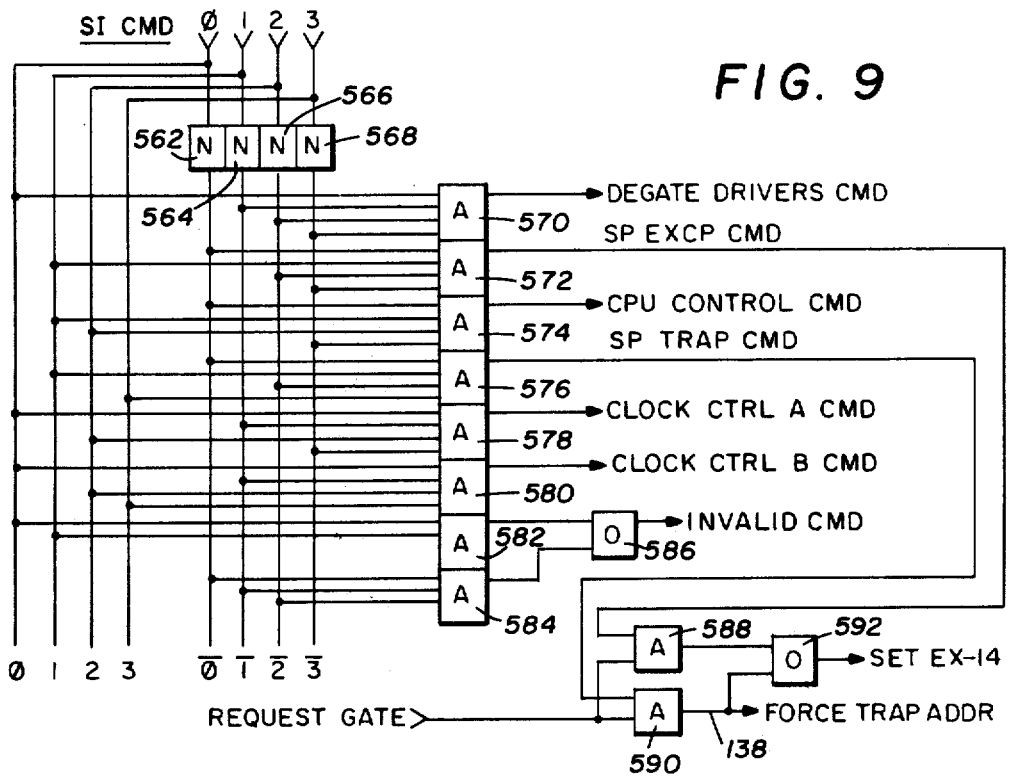
FIG. 9 is a schematic logic diagram illustrating the command decode circuit illustrated in the block diagram of FIG. 2.

Referring to FIG. 9, the logic circuitry comprising the command decode circuit 88 (FIG. 2) is illustrated. The four data bits from the SI Register 84 command field 84b (FIG. 6) are applied directly and through Inverter circuits 562, 564, 566 and 568 to AND circuits 570, 572, 574, 576, 578, 580, 582 and 584. The output of AND circuit 570 generates the DEGATE DRIVERS command and represents the bit pattern 1000. AND circuit 572 generates the SERVICE PROCESSOR EXCEPTION command which represents the bit pattern 0100. AND circuit 574 generates the CPU CONTROL command which represents the 0110 bit pattern. AND circuit 576 generates the SP TRAP command which represents a 0101 bit pattern. AND circuit 576 generates the CLOCK CONTROL A command signal and represents a bit pattern of 1010. AND circuit 578 generates the CLOCK CONTROL B command signal which represents a bit pattern of 1011. The outputs of AND circuits 580 and 582 are applied to an OR circuit 586 which generates the INVALID COMMAND signal. The SP EXCP command signal is applied to an AND circuit 588 together with the REQUEST GATE signal generated by service contol logic 41 (FIG. 2), which is also applied to an AND circuit 590. The output of AND circuit 588 is applied to an OR circuit 592. The SP TRAP command signal is applied to AND circuit 590. The output of AND circuit 590 generates the FORCE TRAP ADDRESS signal applied via signal line 138 to next address logic circuit 140 (FIG. 2). The output of AND circuits 590 is also applied to OR circuit 592 to generate the SET EX-14 signal applied to Exception Register 94 (FIG. 2).

Figure 10:
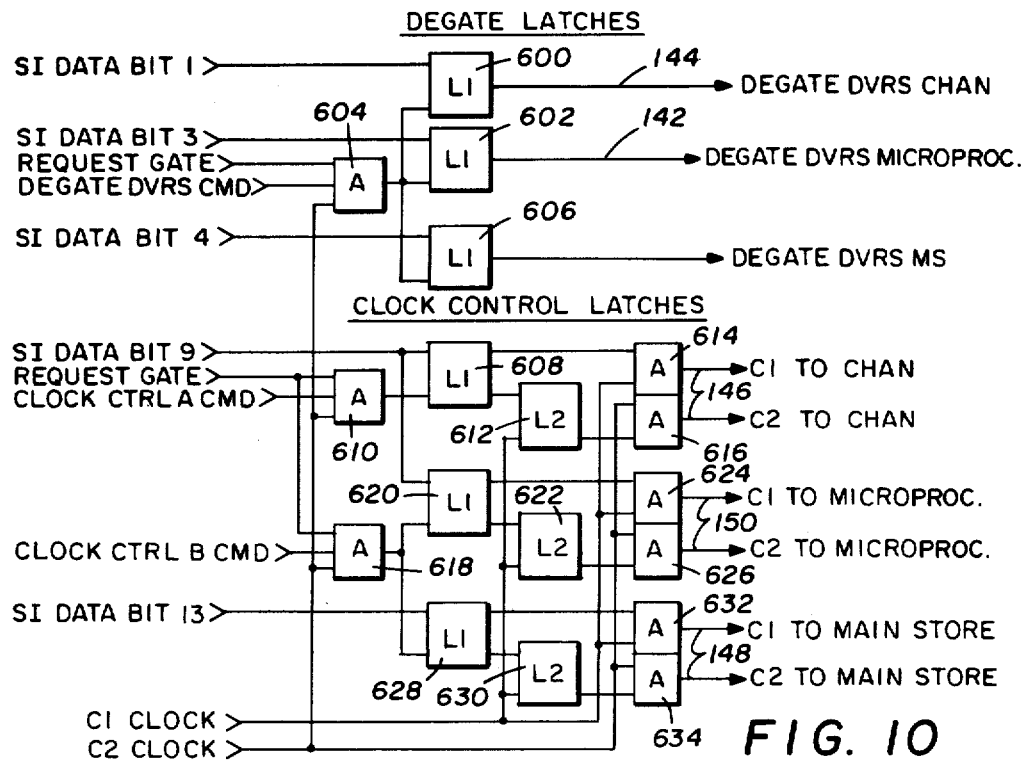
FIG. 10 is a schematic logic diagram illustrating the degate and clock control latches of the clock distribution and control circuit illustrated in the block diagram of FIG. 2.

FIG. 10 illustrates the degate latches and clock control latches of the clock distribution and control circuit 82 (FIG. 2). The SI Register 84 data bit 1 is applied to an L1 SRL 600. The SI Register 84 data bit 3 is applied to an L1 SRL 602. The REQUEST GATE signal and DEGATE DRIVERS command signal together with the C2 Clock signal are applied to an AND circuit 604 whose output is applied to SRL 600 and SRL 602. The output of SRL 600 generates the DEGATE DRIVERS signals for the channel 66 applied via signal line 144 (FIG. 2). The output of SRL 602 generates the DEGATE DRIVERS signal for microprocessor 42 applied via signal line 142 (FIG. 2). The output of AND circuit 604 is also applied to an L1 SRL 606 which also receives as an input the SI Register 84 data bit 4 to generate the DEGATE DRIVERS signal for the main store 50 (FIG. 1).

SI Register 84 data bit 9 is applied to an L1 SRL 608. The REQUEST GATE siganl, CLOCK CTRL A CMD and C2 Clock signal are applied to an AND circuit 610 whose output is applied to SRL 608. The output of SRL 608 is applied to an L2 SRL 612 which also receives as an input the C1 Clock signal. The outputs of SRL 608 and 612 are applied to AND circuits 614 and 616 which also receive the C1 and C2 Clock signals. The outputs of AND circuits 614 and 616 generate the C1 and C2 Clocks to I/O channel control 44 via signal line 146 (FIG. 2).

CLOCK CTRL B CMD is applied to an AND circuit 618 whose output is applied to an L1 SRL 620. The output of SRL 620 is applied to an L2 SRL 622. The outputs of SRLs 620 and 622 are applied to AND circuits 624 and 626 which also receive as input signals the C1 and C2 Clock signals. The outputs of AND circuits 624 and 626 generate and C1 and C2 Clock signals to microprocessor 42 via signal line 150 (FIG. 2).

SI Register 84 data bit 13 is applied to an L1 SRL 628 which also receives as an input the output of AND circuit 618. The output of SRL 628 is applied to an L2 SRL 630. The outputs of SRLs 628 and 630 are applied to AND circuits 632 and 634 which also receive as inputs the C1 and C2 Clock signals. The outputs of AND circuits 632 and 634 generate the C1 and C2 Clock signals to main store control 46 via signal line 148 (FIG. 2).

Figure 11:
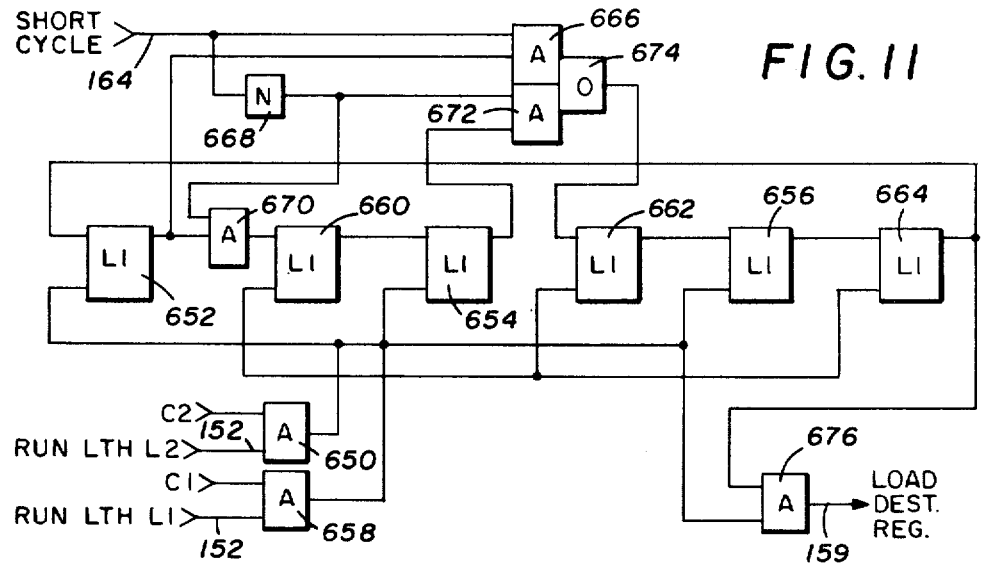
FIG. 11 is a schematic logic diagram of the microprocessor cock generation circuit illustrated in the block diagram of FIG. 2.

Referring to FIG. 11, a portion of the logic circuit of microprocessor clock generation circuit 90 (FIG. 2) is illustrated. Microprocessor clock generation circuit 90 generates the LOAD DESITINATION REGISTER signal applied via signal line 159 to destination decode circuitry 160. The C2 Clock signal and RUN LATCH L2 signal applied from service interface logic unit 40 via signal line 152 are applied to an AND circuit 650 whose output provides the clock signal for L1 SRLs 652, 654 and 646. The C1 Clock signal and the RUN LATCH L1 signal provided by service interface logic unit 40 via signal line 152 is applied to an AND circuit 658 to provide the Clock signal to L1 SRLs 660, 662 and 664.

The SHORT CYCLE signal generated by source decode circuit 162 and applied via signal line 164 (FIG. 2) is applied to an AND circuit 666 and through an Inverter circuit 668 to AND circuits 670 and 672. AND circuit 666 also receives as an input the output of SRL 652. AND circuit 672 also receives as an input the output of SRL 654. The outputs of AND circuits 666 and 672 are applied to an OR circuit 674 which applies its as an input to SRL 662.

The output of SRL 664 is applied to an AND circuit 676 which also receives as an input the output of AND circuit 658 to generate the LOAD DESTINATION REGISTER signal via signal line 159.

Figure 12:
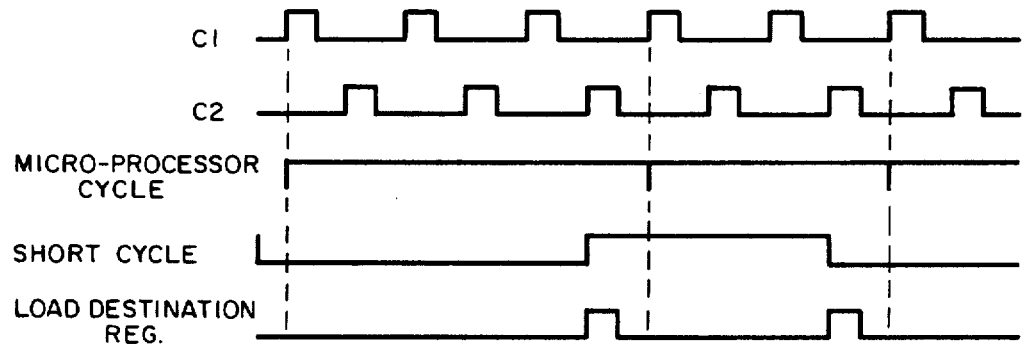
FIG. 12 is a timing diagram illustrating the C1 clock, C2 clock, short cycle and load designation register signals for a microprocessor cycle.

FIG. 12 is a timing diagram illustrating the relationship between the C1 and C2 nonoverlapping Clock signals, the microprocessor cycle together with the SHORT CYCLE and LOAD DESTINATION REGISTER signals. The LOAD DESTINATION REGISTER signal is the last clock of a microinstruction cycle regardless of whether the microinstruction cycle is short or long.

Figure 13:
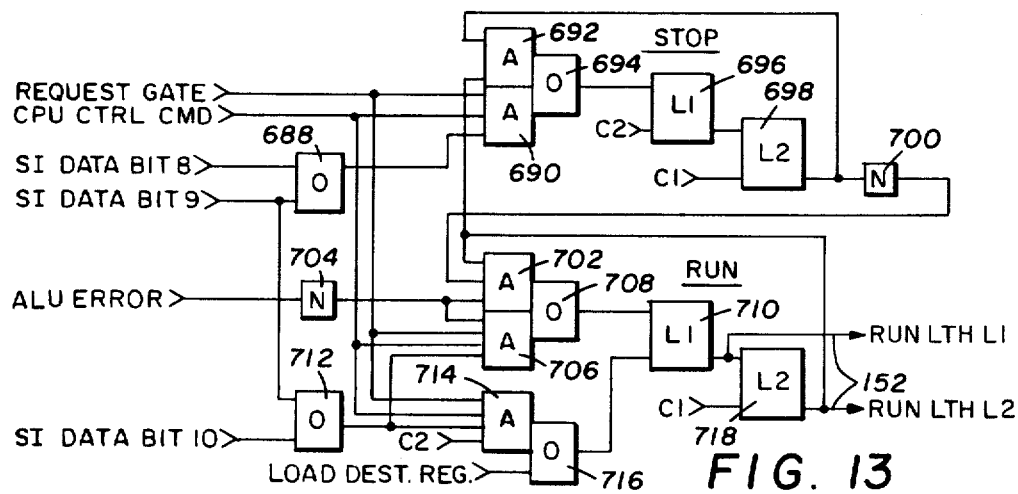
FIG. 13 is a schematic logic diagram illustrating the microprocessor run/stop control portion of the service control logic illustrated in the block diagram of FIG. 2.

Referring to FIG. 13, a portion of the logic circuitry of service control logic unit 41 is illustrated. FIG. 13 illustrates the logic circuitry necessary to generate the RUN LATCH L1 and L2 signals which are applied to microprocessor clock generation circuit 90 via signal line 152. The RUN LATCH L1 and L2 signals are utitlized by microprocessor 42 to control microinstruction execution. RUN LATCH L1 and L2 signals are applied to AND circuits 650 and 658 (FIG. 11) to stop the microprocessor clock generation circuit 90 from operating to thereby stop the generation of clocks used to control a microinstruction execution by microprocessor 42.

SI Register 84 data bits 8 and 9 are applied to an OR circuit 688 whose output is applied to an AND circuit 690. AND circuit 690 also receives as input the REQUEST GATE signal and CPU CONTROL command signal and provides means of setting STOP latch in response to STOP MP and SINGLE CYCLE commands. The output of AND circuit 690 together with the output of AND circuit 692 is applied to an OR circuit 694. The output of OR circuit 694 is applied to an L1 SRL 696 which also receives as an input the C2 Clock signal. The output of SRL 696 is applied as an input together with a C1 Clock signal to L2 SRL 698. The output of SRL 698 is applied as an input to AND circuit 692 and as an input to an Inverter circuit 700. Inverter circuit 700 provides an input to an AND circuit 702 which also receives the ALU ERROR signal applied through an Inverter circuit 704. The output of Inverter circuit 704 is also applied to AND circuit 706 which also receives as an input the CPU CTRL CMD and REQUEST GATE signals, as well as the output of OR gate 712. The outputs of AND circuits 702 and 706 are applied to an OR circuit 708 whose output is applied to an L1 SRL 710.

SI Register 84 data bits 9 and 10 are applied to an OR circuit 712 whose output is applied to an AND circuit 714. AND circuit 714 also receives as inputs the REQUEST GATE signal, CPU CONTROL command signal and C2 Clock signal. The output of AND circuit 714 is applied together with the LOAD DESTINATION REGISTER signal to an OR circuit 716. The output of OR circuit 716 is applied to L1 clock input of SRL 710 whose output is applied to an L2 SRL 718. This arrangement allows for the RUN Latch to be set by the START MP and SINGLE CYCLE commands from the service processor 28 (provided ALU ERROR isn't present) and to be reset at LOAD DEST REG time if the STOP latch is set or an ALU ERROR occurs. L2 SRL 718 also receives as an input the C1 Clock signal. The RUN LATCH L1 and L2 signals are applied via signal line 152 to microprocessor clock generation circuit 90 (FIG. 2). The RUN LATCH L2 signal is also applied to AND circuits 702 and 692.

This arrangement allows the service processor to set STOP and/or RUN latch. The STOP latch, when set, remains set until the RUN latch resets. The RUN latch, when set, remains set until the STOP latch is set or an ALU ERROR is signalled. The state of the RUN latch L1 and L2 control the microprocessor clock generation as described with reference to FIG. 11.

SP 28 and the CPU 20 make use of the hardware and scan capabilities previously described. Using the scan capabilities and the interface control lines, SP 28 can issue commands to CPU 20 through SI Register 84. Using the commands and the scan capabilities of the CPU shift rings 102, 104, 112, and 114, SP 28 can perform numerous diagnostics, loads, and service aids.

Figure 14:
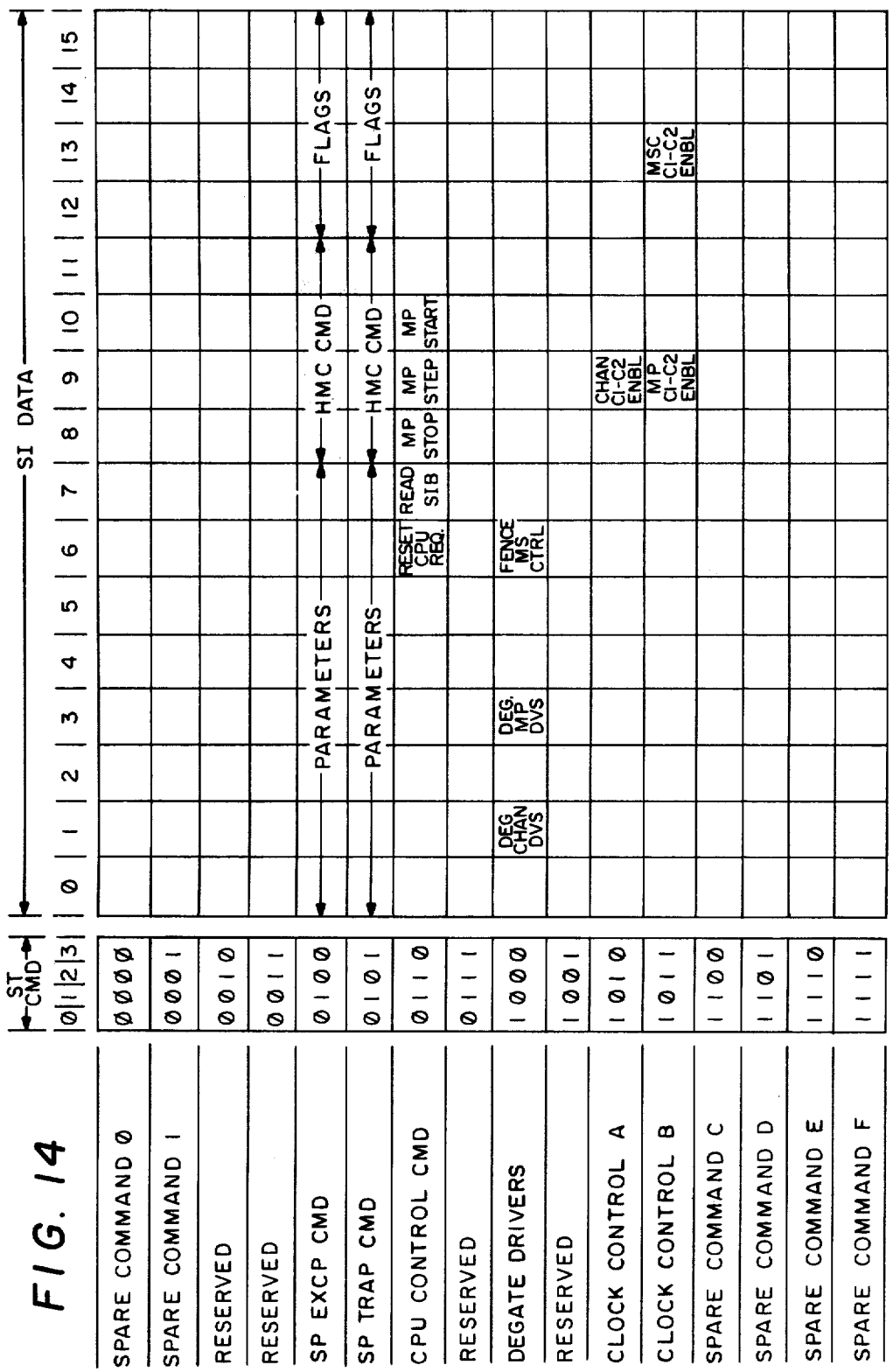
FIG. 14 is a summary of the SI Register commands from the service processor to the central processing unit.

SI Register 84 is a 20 bit register. Commands can be scanned into SI Register 84 and their execution controlled and monitored. FIG. 14 summarizes the SI commands and data field. The commands are described as follows:

SPARE COMMANDS—These commands are not defined and, if used, will cause an SI ERROR indication.

RESERVED COMMANDS—These commands are valid but are not the subject of this invention.

SP EXCP COMMAND—This command is used by SP 28 to pass data and commands to HMC. It causes bit 14 in EX Register 94 to get turned on. This bit is periodically checked by HMC—continuously in the WAIT or STOP states and at the end of each unit of operation in the RUN state. When the HMC detects that EX bit 14 is on, it inspects the SI Register DATA bits, places a response in the SIB Register 86 and resets EX Register 94 bit 14. In the case of the SP EXCP command, RESPONSE is not activated until HMC resets EX bit 14.

Since this command depends on HMC service, it cannot be issued unless the CPU Control Store 108 is loaded with HMC to support the command, and microprocessor 42 is running. If CPU 20 is operating, either in the RUN or WAIT state, or if the HMC is in the STOP state routine, the SI DATA of an SP EXCP command is interpreted by the HMC as a command. In the process of handling these commands to HMC, additional data transfers between SP 28 and HMC are typically necessary, and the SP EXCP command is used to pass this additional data, as well as the initial command. The HMC CMD bits are encoded into sixteen possible commands, and the FLAGS and PARAMETERS to HMC have differing meanings for each of the commands.

As stated earlier, when an SP EXCP command is received by HMC, it inspects the SI Register, places a response in SIB Register 86 and resets EX bit 14 of Exception Register 94. For those situations where SP 28 was passing a command to HMC, the response placed in SIB Register 86 indicates whether the command was accepted or rejected as follows: X‘4000’ implies that the command was accepted by HMC and is being processed. X‘4400’ implies that the SP EXCP command was accepted by CPU 20 hardware, and was found to be a valid command by HMC, but the HMC has rejected the command because it was not issued under the proper circumstances. X‘4500’ implies that the command was rejected because it was not one of the defined HMC commands.

Several of these commands to HMC require additional data transfers between SP 28 and the HMC to complete the command. The SP EXCP command is used for these transfers as well as for the command. The number of those transfers and their direction is determined by convention for the command being processed, and all sixteen DATA bits are used to transfer this data.

When SP 28 is transferring data to HMC, it uses the SP EXCP command with sixteen bits of data in the SI Register 84 DATA field. This sets EX bit 14 of Exception Register 94, which alerts the HMC that the data is available in SI Register 94. The HMC retrieves the data from SI Register 84, places X'4000' in SIB Register 86, indicating acceptance, and resets EX bit 14 causing RESPONSE to activate indicating to SP 28 that the transfer is complete. SP 28 may or may not retrieve the SIB Register 86 data to verify acceptance. When SP 28 is receiving data from the HMC, it uses the SP EXCP command with an SI Register 84 DATA field of all zeros. This sets EX bit 14 of Exception Register 94, which alerts the HMC that SP 28 is ready to receive the data. The HMC then places the data to be transferred into SIB Register 86 and resets EX bit 14 causing RESPONSE to activate indicating to SP 28 that the data is available in SIB Register 86. SP 28 then issues a CPU control command to READ SIB into SI Register 86 and then scans the data out of SI Register 84 and the transfer is complete.

SP TRAP COMMAND—The SP EXCP command provides a vehicle for SP 28 to request the service of the HMC. Several of these commands can only be accepted when the HMC is in the STOP state routine. The SP TRAP command allows SP 28 to start microprocessor 42 running at the SP Trap handler. The SP TRAP command turns on EX bit 14 of Exception Register 94, and the SP Trap handler will place a X'4000' accepting the command in the SIB Register 86 and reset EX bit 14, causing RESPONSE to activate. After accepting the command, the HMC enters the same routine as is entered during the operating state, the STOP state routine. In this routine, the HMC will accept and handle SP EXCP commands.

CPU CONTROL COMMAND—This command is used to control various miscellaneous control functions in CPU 20.

Bit 6—RESET CPU REQUEST—When CPU 20 has a message to pass to SP 28, it places the data in SIB Register 86 and activates CPU REQUEST. The SP 28 must monitor this line and when it becomes active, a CPU CONTROL command must be issued with this bit on. When this command is issued, bit 7 should also be on, to transfer the data from SIB Register 86 to SI Register 84 for scan out.

Bit 7—READ SIB—When data is to be transferred from CPU 20 to SP 28, CPU 20 places the data in SIB Register 86. To transfer this data, the data must be moved from SIB Register 86 to SI Register 84, and then scanned out. This bit causes the SIB Register 86 to SI Register 94 transfer of data.

Bit 8—STOP MICROPROCESSOR—This bit is used to STOP microprocessor 42. It stops microprocessor 42 from fetching and executing HMC.

Bit 9—STEP MICROPROCESSOR (SINGLE CYCLE)—This bit is used to allow microprocessor 42 to fetch and execute one CPU microinstruction.

Bit 10—START MICROPROCESSOR—This bit is used to start microprocessor 42 executing HMC.

DEGATE DRIVERS COMMAND—When a particular scan ring is scanned into or out of, the signals originating in that area will activate and deactivate in a random manner. There are two modes of ignoring these signals; "degating" the drivers at the source; or "fencing" the receiving areas from monitoring these signals. This command controls all degating and fencing possible in CPU 20.

Bit 1—DEGATE CHANNEL DRIVERS—This bit controls a latch that degates the CHAN drivers, so that the CHAN shift ring 112 can be shifted without indicating false commands to devices on the channel. A one indicates that the drivers should be degated.

Bit 3—DEGATE MICROPROCESSOR DRIVERS—This bit controls a latch that degates the Microprocessor Drivers to Control Store 108, Main Store Control 46, and Service control logic 41 so that the microprocessor scan ring 104 can be scanned without affecting the others. A one indicates that the drivers should be degated.

Bit 6—FENCE MS CONTROL—This bit controls a latch that fences the Main Store 50 Refresh and Control logic from the other rings, so that they may be shifted without effecting the refreshing of the Main Store 50. A one indicates that fencing should occur.

CLOCK CONTROL COMMAND A—This command serves to enable a subset of the clocks. The enabling of clocks is used in conjunction with CLOCK CONTROL COMMAND B.

Bit 9—CHAN C1/C2 ENABLE—This bit is used to set and reset the latch that enables the C1 and C2 system clocks to the CHAN 66. A one sets the latch and enables the clocks. When the clocks are allowed, they will start with a C1, and when they are stopped, the last clock will be a C2.

CLOCK CONTROL COMMAND B—This command is used to control the remaining CPU clocks not controlled by CLOCK CONTROL COMMAND A.

Bit 9—MP C1/C2 ENABLES—This bit is used to set and reset the latch that enables the microprocessor 42 C1/C2 system clocks. A one sets the corresponding latch and enables the clocks. When the clocks are enabled, they will start with a C1, and when they are stopped, the last clock will be a C2.

Bit 13—MSC C1/C2 ENABLE—This bit is used to set and reset the latch that enables the C1/C2 system clocks to Main Store Control 46. A one sets the latch and enables the clocks. When the clocks are enabled they will start with a C1, and when they are stopped, the last clock will be a C2.

It therefore can be seen that the present invention provides for a maintenance interface for a service processor and central processing unit operating asynchronously to each other. The present maintenance interface includes circuitry for synchronizing the service processor with the central processing unit and decode circuitry for interpreting commands from the service processor to the central processing unit. The maintenance interface of the present invention also includes circuitry responsive to control signals from the central processing unit. The present maintenance interface facilitates the use of LSSD testing procedures by degating central processing unit interfaces as required for this testing approach. The interface also provides for other functions required such as alter display, stop, start, single cycle or IMPL.

Whereas the present invention has been described with respect to specific embodiments thereof, it will be understood that various changes and modifications will be suggested to one skilled in the art, and it is intended to encompass such changes and modifications as fall within the scope of the appended claims.

Having thus described the invention, what is claimed as new and desired to be secured by Letters Patent is:

1. In a computer system having a service processor for generating commands and a central processing unit for generating control signals and operating asynchronously to the service processor, a computer interface comprising:

means for synchronizing the operation of the service processor with the operation of the central processing unit;

said synchronizing means including first and second register means;

said first register means being operable for receiving information from the service processor in response to a command generated by the service processor to the central processing unit;

said second register means being operable for receiving information from the central processing unit in response to a control signal generated by the central processing unit and for holding the received information;

means for transferring information from said first register means to the central processing unit in response to a control signal generated by the central processing unit;

means for transferring information from said second register means to said first register means in response to a command generated by the service processor to the central processing unit for information transfer to the service processor; and said synchronizing means being operable to eliminate communication contention between the service processor and the central processing unit.

2. The computer interface of claim 1 wherein the central processing unit includes microprocessing means.

3. The computer interface of claim 1 and further including:

means responsive to the commands generated by the service processor for temporarily suspending the operation of the central processing unit.

4. The computer interface of claim 1 and further including:

means for generating clocking signals to the central processing unit for effecting one instruction cycle of the central processing unit.

5. The computer interface of claim 1 wherein said first register means operates to receive information from the service processor independently of the operation of the central processing unit.

6. The computer interface of claim 1 and further including:

means for preventing the central processing unit from executing commands from the service processor until said means for transferring information has completed a transfer of information from said second register means to said first register means.

7. The computer interface of claim 1 and further including:

means for preventing the further transfer of information from the service processor to said first register means until the central processing unit generates a command to the service processor.

8. The computer interface of claim 1 wherein said means for synchronizing further includes:

internal storage elements connected for operation in a nondiagnostic mode and connected serially as a shift ring for operation in a diagnostic mode.

9. A computer system comprising:

first processing means for generating commands and transmitting and receiving data;

second processing means for generating commands and transmitting and receiving data and operating asynchronously to said first processing means;

interface means interconnected to said first and second processing means for enabling the transmission of said commands and data generated by either said first or said second processing means between said first and said second processing means without communication contention and loss of data and commands transferred between said first and said second processing means; and said interface means and said second processing means including a plurality of internal storage elements connected for operation in a nondiagnostic mode and connected serially as a plurality of shift rings for operation in a diagnostic mode.

10. The computer sysem of claim 9 wherein said first processing means comprises a service processor and said second processing means comprises a microprocessor.

11. The computer system of claim 9 and further including:

input/output devices and a main store interconnected to said second processing means; and said interface means including means for suspending operation of said second processing means while permitting continued operation of said main store.

12. The computer system of claim 9 wherein said internal storage elements comprise latch means.

13. The computer system of claim 9 wherein said interface means includes means for preventing operation of ones of said shift rings.

14. The computer system of claim 9 wherein said interface means generates clock signals for application to said shift rings for performing diagnostic testing of said second processing means.

15. The computer system of claim 9 wherein said interface means includes:

first register means for receiving commands and data from said first processing means in response to commands generated by said first processing means to said second processing means; and second register means for receiving commands and data from said second processing means in response to commands generated by said second processing means.

16. The computer system of claim 15 wherein said interface means further includes:

means for transferring data from said first register means to said second processing means in response to a command generated by said second processing means; and means for transferring data from said second register means to said first register means in response to a command generated by said first processing means to thereby transfer data to said first processing means without loss of data.

17. The computer system of claim 16 wherein said interface means further includes:

means for preventing execution of commands from said first processing means other than a predetermined unique command for transferring data from said second register means to said first register means.

18. The computer system of claim 9 wherein said first and second processing means comprise digital processors and associated memory storage circuits.

19. The computer system of claim 9 wherein said interface means further includes:
means responsive to a command from said first processing means for interrupting the operation of said second processing means.

20. A computer system having input/output units and a main store unit comprising:
first processing means for generating commands and transmitting and receiving data;
entry command display means for communicating information between an operator and said first processing means;
second processing means for generating commands and transmitting and receiving data and operating asynchronously to said first processing means;
processor interface means interconnecting said first and second processing means for synchronizing the operation of said first and second processing means;
input/output interface means interconnected to said second processing means for interfacing to the input/output units;
memory store interface means interconnected to said second processing means for interfacing to the main store unit;
said interface means and said second processing means each including internal storage elements connected for operation in a nondiagnostic mode and connected serially as a plurality of shift rings for operation in a diagnostic mode; and
said processor interface means including means for addressing ones of said shift rings for providing data to the input/output units, to the main store unit and to said second processing means and for receiving data from the input/output units, from the main store unit and from said second processing means.

21. The computer system of claim 20 wherein said processor interface means receives serial data from said first processing means and transmits parallel data to said second processing means.

22. The computer system of claim 20 wherein said means for addressing includes:
means for decoding commands generated by said first processing means and received by said processor interface means.

23. The computer system of claim 20 wherein said internal storage elements comprise latch means.

24. The computer system of claim 20 wherein said processor interface means further includes:
first register means for receiving information from said first processing means in response to a command generated by said first processing means to sad processor interface means;
second register means for receiving data from said second processing means in response to a command generated by said second processing means;
means for transferring data from said first register means to said second processing means in response to a command generated by said second processing means; and
means for transferring data from said second register means to said first register means in response to a command generated by said first processing means to thereby transfer data to said first processing means.

25. The computer system of claim 20 wherein said processor interface means further includes:
means for temporarily suspending the operation of said second processing means for conducting diagnostic testing in said diagnostic mode of operation.

26. The computer system of claim 20 wherein said processor interface means further includes:
means for effecting one instruction cycle of operation of said second processing means.

27. The computer system of claim 20 wherein said processor interface means further includes:
means for interrupting the operation of said first processing means if an error condition is detected by said second processing means; and
means for transmitting an error indication to said entry command display means for providing information to the operator.

28. The computer system of claim 20 wherein said first processing means initializes and displays the contents of said internal storage elements of said second processing means.

29. The computer system of claim 20 and further including:
means for independently scanning one of said shift rings while not effecting the operation of other ones of said shift rings.

30. A method of synchronizing the operation of a service processor and a central processing unit operating asynchronously to each other to permit contention free communication between the service processor and the central processing unit comprising:
generating a command from the service processor to logic interface circuits to initiate service processor to central processing unit communication;
shifting information and commands into a first register contained within said logic interface circuits;
decoding said commands to permit the central processing unit to receive the information shifted into said first register;
loading information into a second register contained within said logic interface circuits generated by the central processing unit to initiate central processing unit to service processor communication; and
generating a unique command from the service processor to said logic interface circuits for transferring the information from said second register to said first register for transmission to the service processor.

31. The method of claim 30 and further including:
prohibiting said logic interface circuits from executing commands from the service processor except for a unique command when information is present within said second register.

32. The method of claim 30 and further including:
generating a command from the service processor for temporarily interrupting the operation of the central processing unit.

* * * * *

UNITED STATES PATENT AND TRADEMARK OFFICE
CERTIFICATE OF CORRECTION

PATENT NO. : 4,268,902
DATED : May 19, 1981
INVENTOR(S) : Neil C. Berglund and James R. Nieling It is certified that error appears in the above-identified patent and that said Letters Patent are hereby corrected as shown below:

Claim 10, Column 26, Line 19 "sysem" should be --system--

Claim 24, Column 27, Line 60 "sad" should be --said--

Signed and Sealed this

Tenth Day of November 1981

[SEAL]

Attest:

GERALD J. MOSSINGHOFF

Attesting Officer     Commissioner of Patents and Trademarks